(12) United States Patent
Komkova et al.

(10) Patent No.: US 6,635,104 B2
(45) Date of Patent: Oct. 21, 2003

(54) GAS SEPARATION DEVICE

(75) Inventors: Elena N. Komkova, Hamilton (CA); Alicja M. Mika, Hamilton (CA); Ronald F. Childs, Dundas (CA)

(73) Assignee: McMaster University (CA)

( * ) Notice: Subject to any disclaimer, the term of this patent is extended or adjusted under 35 U.S.C. 154(b) by 0 days.

(21) Appl. No.: 09/986,984

(22) Filed: Nov. 13, 2001

(65) Prior Publication Data

US 2002/0104439 A1 Aug. 8, 2002

Related U.S. Application Data

(60) Provisional application No. 60/247,385, filed on Nov. 13, 2000, and provisional application No. 60/304,116, filed on Jul. 11, 2001.

(51) Int. Cl.$^7$ .................... B01D 53/22; B01D 71/06
(52) U.S. Cl. .................... 96/4; 95/52; 96/12; 96/14
(58) Field of Search ................ 95/45, 52; 96/4, 96/12–14

(56) References Cited

U.S. PATENT DOCUMENTS

| | | | | |
|---|---|---|---|---|
| 3,616,607 A | * | 11/1971 | Klass et al. ............ | 55/16 |
| 3,657,113 A | * | 4/1972 | Stancell et al. ............ | 210/23 |
| 3,735,559 A | * | 5/1973 | Salemme ............ | 55/16 |
| 3,980,456 A | * | 9/1976 | Browall ............ | 55/158 |
| 4,051,898 A | * | 10/1977 | Yoshino et al. ............ | 165/166 |
| 4,230,463 A | * | 10/1980 | Henis et al. ............ | 55/16 |
| 4,239,507 A | * | 12/1980 | Benoit et al. ............ | 55/16 |
| 4,606,740 A | * | 8/1986 | Kulprathipanja ............ | 96/13 X |
| 4,783,201 A | * | 11/1988 | Rice et al. ............ | 55/16 |
| 4,857,081 A | * | 8/1989 | Taylor ............ | 55/16 |
| 4,871,461 A | * | 10/1989 | Karakane et al. ............ | 95/52 X |
| 4,875,908 A | * | 10/1989 | Kikukawa et al. ............ | 55/16 |
| 4,921,651 A | * | 5/1990 | Polak et al. ............ | 264/41 |
| 4,961,855 A | * | 10/1990 | Reale, Jr. et al. ............ | 95/52 X |
| 5,059,327 A | * | 10/1991 | Takegami ............ | 210/500.34 |
| 5,160,511 A | * | 11/1992 | Lovelock ............ | 55/16 |
| 5,171,449 A | * | 12/1992 | Pasternak et al. ............ | 95/52 X |
| 5,336,298 A | * | 8/1994 | Quinn et al. ............ | 95/52 X |
| 5,409,525 A | | 4/1995 | Kazama et al. ............ | 96/14 |
| 5,576,057 A | * | 11/1996 | Hirose et al. ............ | 96/14 X |
| 5,620,500 A | * | 4/1997 | Fukui et al. ............ | 95/52 |
| 5,693,227 A | * | 12/1997 | Costa ............ | 96/14 X |
| 6,048,383 A | * | 4/2000 | Breault et al. ............ | 95/52 X |
| 6,083,297 A | * | 7/2000 | Valus et al. ............ | 95/52 X |
| 6,145,588 A | * | 11/2000 | Martin et al. ............ | 165/166 |
| 6,413,298 B1 | * | 7/2002 | Wnek et al. ............ | 95/52 |

FOREIGN PATENT DOCUMENTS

| | | | |
|---|---|---|---|
| DE | 8801183 | 12/1989 | |
| FR | 1485004 | 9/1967 | |
| JP | 60205163 | * 10/1985 | |
| JP | 60-235624 A | * 10/1985 | ............ 95/52 |
| JP | 02-014725 A | * 1/1990 | ............ 95/52 |
| JP | 07068141 | 3/1995 | |

OTHER PUBLICATIONS

Selective permeation . . . poly(ethylene glycol)—Hoon Kim et al. Jnl. of Membrane Sci. 186 (2001) 97–107—11 pages.*
Membrane–based . . . moisture resistance—Niu et al. JnL. of Membrane Sci. 189 (2001) 179–191.*
Polymer Handbook—Brandrup et al. John Wiley & Sons, Inc. New York, 1999.*
Dehydration of Water/Ethanol . . . Membrane—Takegami et al. Polymer Jnl. vol. 24, No. 11, pp 1239–1250 (1990)—12 pages.*
Acid recovery . . . membrane—Stachera et al. JnL of Membrane Sci. 148 (1998) 119–127.*
A new class . . . controlled porosity—Mika et al. JnL of Membrane Sci. 108 (1995) 37–56.*
Development of a new . . . $CO_2$—Matsuyama et al. Jnl of Membrane Sci. 93 (1994) 237–244—8 pages.*
Viscoelastic Properties . . . Hydrogels—Yonese et al. Polymer Jnl. vol. 24, No. 4, pp 395–404 (1992)—14 pages.*
Basic Principles of Membrane Technology—Marcel Mulder Kluwer Chapter 5, Academic Publishers (1989).*
Modern Aspects of Electrochemistry—Tilak et al. Plenum, Press, New York. 1986.*
An Interpolymer . . . Poly(styrene Sulfonic acid)—Koyama et al. Jnl. of Applied Polymer Sci., vol. 27, 2783 (1982).*
Gas Separation with High–Flux Cellulose Acetate Membranes—Gantzel et al. Ind. Eng. Chem. Process Des. Develop. vol. 9, No. 2, 1970.*

* cited by examiner

*Primary Examiner*—Robert H. Spitzer
(74) *Attorney, Agent, or Firm*—Katten, Muchin, Zavis, Rosenman

(57) ABSTRACT

Disclosed is a separation device for the separation of water vapour from a gas stream, comprising a water vapour separation membrane having a porous membrane, whose pores contain a water transfer material, the water transfer material including a first hydrophilic polymer and a second polymer which is interwoven with the first polymer.

54 Claims, 3 Drawing Sheets

A - starting roll of porous support membrane
B - application of polymeric strong acid catalyst
C - roller (which may be heated)
D - drying stage
E - application of water transfer material
F - cross-linking (curing) stage
G - drying stage
H - finished water vapour transfer membrane

GAS SEPARATION DEVICE

REFERENCE TO CO-PENDING APPLICATIONS

The subject matter of provisional application serial No. 60/247,385 filed Nov. 13, 2000 and entitled "MEMBRANES FOR WATER VAPOR EXCHANGE" is incorporated herein by reference. The subject matter of provisional application serial No. 60/304,116 filed Jul. 11, 2001 and entitled "MEMBRANES FOR WATER VAPOUR EXCHANGE" is also incorporated herein by reference.

BACKGROUND OF THE INVENTION

1. Field of the Invention

The present invention relates to membranes for separations of gas mixtures and more particularly, but not necessarily exclusively, to porous mechanical supports filled with a water transfer material for water vapor separations from gas mixtures as well as to porous mechanical supports filled with a gas transfer material for acid and basic gas separations.

2. Description of the Related Art

Water vapor removal from air or other gases is an important process in a variety of industries including chemical, electric, electronic, and food industries as well as for the moisture control of air for air conditioning in buildings. The use of membranes for removal of water vapor from gases has many advantages over other conventional methods such as compression, cooling, or adsorption, including lower operating and energy costs and continuous operation.

There are a number of patents that deal with membrane-based gas dehydration processes and membrane modules as well as with membrane materials. Membranes applied in gas dehydration processes can be divided into two general groups, i.e., one containing dense homogeneous membranes or dense separating layers and one containing porous membranes often carrying a humectant in the pores.

The homogenous membranes provide a high separation ratio but have a disadvantage in that the permeation rate is low. A typical homogeneous membrane used for separation of water from hydrocarbons and chlorinated hydrocarbons is disclosed in U.S. Pat. No. 4,857,081 [1] and consists of hollow fiber made of cuproammonium cellulose. The permeability of this membrane to water is extremely low, amounting to less than 20 ml of water per hour per mmHg per square metre.

The transport of gas or vapor through a dense membrane is described by the solution-diffusion mechanism, i.e., the permeability of gas through the membrane is the product of the gas solubility in the membrane material and its diffusivity in the membrane [2].

The diffusivity is a kinetic parameter which reflects the rate with which the penetrant is transported through the membrane. The parameter is dependent on the geometry (size) of the penetrant. Generally, the diffusion coefficient decreases with an increase in the molecular size of the penetrant. However, in the strongly interacting systems where the penetrant has an ability to swell the membrane material, even large molecules of organic vapors can have large diffusion coefficients.

Solubility is a thermodynamic parameter that gives a measure of the amount of the component sorbed by the membrane under equilibrium conditions. The solubility of an ideal gas is described by the well known Henry law which states that the concentration of gas in the polymer is proportional to the applied pressure. When strong interactions occur between the penetrant molecules and the polymer, the sorption isotherms show large positive deviations from Henry's law.

Polyelectrolytes are generally very hydrophilic materials interacting strongly with water and thus providing high values of the solubility parameter. However, most polyelectrolytes are water soluble materials with poor film-forming properties. As such they cannot be used to form dense gas separation membranes. These problems can be overcome to a certain extent by using ionomer-type polyelectrolytes which contain small amounts of ionic groups on a hydrophobic chain or on pendents of the main hydrophobic chain. Such polymers are insoluble in water and have typically good film-forming properties. Salemme in U.S. Pat. No. 3,735,559 [3] discloses a permeselective membrane for water vapor transport made from dense films of partially sulfonated polyxylylene oxide (ionomer-type polyelectrolyte insoluble in water) in various ionic forms. The disclosed membranes have, however, some problems such as the need to pre-shrink them to avoid rupturing. They are also unstable in the acid form resulting in formation of detrimental uncontrolled cross-linking. Moreover, hydrolysis in the presence of water can lead to the liberation of sulfuric acid. Changing the ionic form of the polymer from the acid form to the salt form makes the membranes more stable but they are then prone to densification in the presence of water.

In another example of use of a dense film ionomer type of membrane disclosed in U.S. Pat. No. 5,160,511 [4], small diameter, thin-walled tubing of perfluoroethylene sulfonic acid obtained from E. I. DuPont de Nemours under their trade name "Nafion" was immersed in lithium hydroxide for several hours before being washed and dried. The sulphonic acid groups of the original tubing were converted to lithium salts thus increasing thermal stability of the material without substantially reducing the water vapour permeability. The tubing was used as a membrane in a gas dehydration process.

The major deterrent in using the fluorocarbon-based membranes is their cost. The perfluorinated materials are very chemically stable but very expensive materials. They are used predominantly in extremely aggressive environments such as are faced, for example, by membrane separators in chlor-alkali industry [5].

Since the permeability of molecules through dense polymers is generally very low, it is generally accepted that the efficiency of membranes can be improved by making them very thin. Ultra thin membranes are not mechanically strong and to overcome this drawback, composite membranes are made in which a very thin separating layer is superimposed on an anisotropic, non-selective porous support of high permeability. This construct allows for a reasonably high permeation rate combined with mechanical strength. The essential function of the porous support is to provide mechanical support for the thin separating layer.

There are two types of these "thin film" membranes that are suitable for gas or vapour separation, namely, asymmetric membranes and composite membranes. In the asymmetric membranes, the thin separating layer is made from the same material as the microporous supporting layer. This density gradient across the membrane thickness is typically achieved by casting a membrane from a polymer solution, letting the solvent evaporate partially from one surface of the cast followed by immersion precipitation in a non-solvent bath. A classical example of an asymmetric membrane for gas separation is the Loeb-Sourirajan type membrane made of acetyl cellulose [6]. In composite membranes, the very thin selective layer is deposited on a non-selective sublayer by coating, interfacial polymerization, or plasma polymerization. Examples of gas separation membranes having thin separating layers superimposed on a porous support are provided by Klass et al., U.S. Pat. No. 3,616,607 [7], Stancell et al., U.S. Pat. No. 3,657,113 [8] and by Kikukawa et al., U.S. Pat. No. 4,875,908 [9]. In the latest example, a material, described as fluororesin-type copolymer containing hydrophilic sulfonic or sulfonate groups is used to form the separating layer. The material is cast as a dense film from a solution preferably onto a support layer. The membrane has a thickness of about 0.1 to about 50 micrometers and shows excellent water vapor permeability combined with high selectivity.

Examples of asymmetric gas dehydration membranes with controlled porosity and graded-density skin are disclosed in U.S. Pat. No. 4,783,201 [10]. The membranes have water vapour permeance in the range of $3–15\times10^{-4}$ cm$^3$/cm$^2\cdot$s$\cdot$cmHg and a separation factor for water vapour over slow gas components of the feed stream of about 10 to about 50. This water vapour permeance is up to 3000 times larger that the permeance of a comparable dense membrane as described in U.S. Pat. No. 4,857,081.

A major drawback of both asymmetric and composite gas separation membranes is the existence of minute defects caused by gas bubbles, dust particles, etc. These are very difficult to eliminate. Such defects do not significantly affect the membrane performance in separations of liquids but can be detrimental in gas separation applications. Browall, U.S. Pat. No. 3,980,456 [11] disclosed that this drawback could be overcome by an application of an additional thin sealing layer of relatively permeable material over the membrane surface. Later, Henis and Tripodi at Monsanto [12] applied this concept to sealing defects in polysulfone Loeb-Sourirajan type membranes with silicone rubber. The silicone rubber layer in the Henis and Tripodi patent does not function as selective barrier but rather plugs up defects, thus reducing non-diffusive gas flow. Even though the gas flow over non-selective silicone rubber is very high compared to the flow though the defect-free portion of the membrane, the total flux through these plugged defects is negligible due to very low surface area of these plugged defects.

The multilayer construct approach and/or plugging techniques for gas separation membranes makes the membranes complex and costly. For many dehydration applications the membrane cost is the limiting factor. Additionally, the multilayer membranes are sensitive to abrasion and have rather limited environmental resistance. Therefore, it would be advantageous to develop a relatively inexpensive but robust gas dehydration membrane with high flux and desired selectivity but also having high structural strength, toughness, and abrasion resistance.

A relatively simple and inexpensive route to such membranes involves using the above mentioned second type of gas separation membranes, namely, relatively thick porous membranes. Depending on the pore size, the gas transport in porous membranes can occur as Poiseuille flow or Knudsen diffusion [2]. If the pore size is relatively large such that the ratio of pore radius to the mean free path of gas molecules is larger than 5, viscous flow (Poiseuille flow) prevails and no separation takes place. On the other hand, if the pore size is small relative to the mean free path of gas molecules, the resistance caused by collisions among gas molecules and between the molecules and pore walls determines the transport rate. Such transport is known as the Knudsen diffusion. In cases when the Knudsen diffusion is the transport mechanism, gases with small molecular weight (e.g. hydrogen) permeate more rapidly than those with large molecular weight (e.g., carbon dioxide), thus enabling a separation. The selectivity of separation of gas mixtures by the Knudsen mechanism is, however, rather low. It can be estimated from the ratio of the molecular weight square roots of the mixture components. In the case of oxygen-water vapour mixture this ratio is very close to one and little or no selectivity can be achieved.

A further mechanism of gas separation by porous membranes involves capillary condensation. It requires the use of membranes with pore size of a few Å to a few tens of Å and can be applied to gas mixtures containing a condensing gas or vapour (e.g., water vapor). Such a membrane containing pores in the range of 10–100 Å and permeability from $100\times10^{-7}$ to $1000\times10^{-7}$ moles of air/cm$^2$/min/cmHg is disclosed in U.S. Pat. No. 4,239,507 [13]. The capillary condensation of a condensable component is ensured by adjusting the partial pressure of the component or temperature of the gas mixture as a function of the membrane mean pore radius. The necessity to adjust the partial pressure and temperature of gas mixtures to ensure the capillary condensation makes the process costly and limits the application to some special cases such as purification of uranium hexafluoride as disclosed in U.S. Pat. No. 4,239,507 [13].

U.S. Pat. No. 4,051,898 [14] discloses a porous-plate humidity exchanger made from either a Japanese paper treated with a moisture absorbing compound such as poly (vinyl alcohol) or asbestos paper treated with poly (vinylchloride) and poly(vinyl acetate). In another version of the porous-plate humidity exchanger disclosed in the Japanese Patent Document 60-205163 A1 [15], a microporous polymer film saturated or coated with a moisture absorbing substance is used. The substance is a combination of a hydrophilic polymer such as poly(vinyl alcohol) and a hygroscopic inorganic salt such as lithium chloride to form a membrane. The membranes produced by these processes provide a high permeation rate for the absorbed component (e.g., water) but the pore-filling absorbent tends to be exuded from the membrane under relatively low pressure conditions. In the case of dehumidification, the host porous membrane, with its hygroscopic inorganic salt/polymer combination, absorbs water when the membrane is used or left standing under high humidity conditions giving an aqueous solution of the incorporated salts in the pores. Such a solution can exude from the membrane even without a pressure difference across the membrane.

A moisture-transferring thin-film composite membrane is disclosed in U.S. Pat. No. 6,145,588. [16] The thin-film of the composite membrane obtained by interfacial polymerization of polyfunctional amines with polyfunctional acyl halides on the surface of a porous support. The film defects are subsequently sealed by applying a polymeric coat overlying the film.

SUMMARY OF THE INVENTION

It is an object of the present invention to provide improved membranes for separation of gas mixtures.

Briefly stated, the invention involves a separation device for the separation of water vapour from a gas stream, comprising a porous support whose pores contain a water transfer material, the water transfer material including a first water absorbent constituent and a second constituent which is interwoven with the first constituent to improve water transfer.

In one embodiment the first and second constituents of water transfer material are polymers which form a water-swellable gel. The term "gel" is intended to mean a three-dimensional network, owing to the cross linking of at least one of the polymers.

In another of its aspects, the present invention provides a separation device for the separation of water vapour from a gas stream, comprising a separation membrane having a porous support whose pores contain a water swellable gel, the gel including a first water absorbent polymer and a second polymer which is interwoven with the first polymer to improve the water absorbing and transfer capability of the gel.

Preferably, the first polymer forms a network which is entangled with elements of the membrane and also with the second polymer. In this case, the second polymer may or may not be cross linked. This entangled gel of the first and second polymers have a high affinity for water. The network does not substantially dissolve in water owing to the cross linking of at least the first polymer constituent. Preferably, the first polymer, the second polymer or both contain ionizable or ionic functionality and include polyelectrolytes.

Preferably, the first or second polymers are either entangled with or grafted to individual elements of the support, or both.

In the grafted case, the first constituent may or may not itself form a network. The grafting can be carried out, for example, by radical polymerization of a suitable monomer contained within the pores of the porous support membrane. The second constituent may be a polymer or a polymer network which is entangled with the grafted first constituent. (See A. M. Mika, R. F. Childs, J. M. Dickson, B. E. McCarry and D. R. Gagnon, "A New Class of Polyelectrolyte-Filled Microfiltration Membranes with Environmentally Controlled Porosity". *J. Membr. Sci.* 108, (1995) 37–56 [17]).

In the entangled case, the first constituent is a polymer network. The second constituent is a polymer that may or may not itself form a polymer network.

In both the grafted and entangled cases, the first and second polymers may be, to a limited extent, cross linked together, but only if it does not unduly restrict the water content and water transfer capabilities of the material.

Preferably both of the polymers of the water transfer material are interwoven or entangled with the elements of the porous support. However, there may be cases where essentially only the first polymer is entangled with the porous support. The first polymer, the second polymer, or both, may be cross-linked. The cross linking, in this case, has the effect of forming either a network of one polymer (i.e. when only one polymer is cross-linked) or an entanglement of two independent polymer networks. In this manner, at least one of the polymers is physically anchored to the elements of the porous support, by having the effect of knotting it/them to those elements. In the case where only one constituent is an independent cross linked network, it is desirable that the other constituent be retained, in some fashion, within the support without impairing the water transfer kinetics of the materials. The retention of the non-cross-linked entangled constituent can be enhanced by increasing its molecular weight or degree of chain branching and/or the presence of hydrogen bonding or dipole/dipole intermolecular interactions.

In one embodiment, both the first and second constituents are independently cross linked, meaning there are substantially no cross links between the first and second constituents. In other words, there are, in this case, no deliberate cross links between the first and second constituents, though some incidental cross linking is possible.

In another embodiment, the first and second constituents are cross linked together, but only to a degree that will not unduly impair the water transfer kinetics of the water transfer material. It is suspected that the greater the cross linking between the first and second polymers, the lower the water uptake capability of the water transfer material and consequently its usefulness as a water transfer material.

For example, with cross-linked poly(4-vinylpyridinium salts) this effect is clearly evident as the degree of cross-linking exceeds some 15%. [18]

Preferably, the gel includes a first cross-linking agent to cross link the first polymer at a molar proportion relative to the first polymer of between about 0.5 and about 15 percent, more preferably, between 0.5 and 10 percent, and still more preferably between 0.5 and 5 percent.

Preferably, the gel includes a second cross-linking agent to cross link the second polymer at a molar proportion relative to the second polymer.

Preferably, the weight content of the second polymer in the gel ranges from about 10 percent to about 90 percent, more preferably from about 25 percent to about 75, still more preferably from about 40 percent to about 60 percent.

The second polymer may be a polyanion cross-linked with a cross-linking agent containing multiple positive charges. In one embodiment, the cross-linking agent is a multivalent metal selected from the group consisting of $Mg^{2+}$, $Ca^{2+}$, $Sr^{2+}$, $Ba^{2+}$, $Al^{3+}$, $Fe^{2+}$, $Fe^{3+}$, $Sn^{2+}$, $Sn^{4+}$, $Mn^{2+}$, $Mn^{3+}$, $Ti^{4+}$, $Zr^{4+}$, $V^{2+}$, $V^{3+}$, $Cu^{2+}$, $Ni^{2+}$, $Co^{2+}$, $Zn^{2+}$, and $Cr^{3+}$. In another embodiment, the cross-linking agent contains multiple positively charged sites including bis-, tris, or higher ammonium salts. For example, the salts may be selected from the group consisting of salts of ethylenediamine, 1,3-diaminopropane, piperazine, hexamethylenediamine and its homologues, 1,4-diazabicyclo[2,2,2]octane diethylenetriamine, triethylenetetramine, and tetraethylenepentamine.

Alternatively, the second polymer may be a polycation cross-linked with a cross-linking agent containing multiple negative charges (a multivalent anion) including $SO_4^{2-}$ and $PO_4^{3-}$ The cross-linking agent may contains multiple negatively charged sites including, but not limited to, the salts of di-, tri- and higher polyacids. The salts may be selected from the group consisting of succinic acid, glutaric acid, adipic acid, and higher homologues of these acids, fumaric acid, maleic acid, malic acid, oxalic acid, tartaric acid, citric acid, phthalic acid, trimesoic acid.

Preferably, the first polymer includes a covalent cross-linking agent. In one embodiment, the cross-linking agent may be selected from the group consisting of bisacrylamidoacetic acid, 1,3-butanediol diacrylate, 1,4-butanediol diacrylate 1,3-butanediol dimethacrylate, 1,4-butanediol dimethacrylate,1,4-butanediol divinyl ether, N-(isobutoxymethyl)methacrylamide, 1,4-cyclohexanediol dimethacrylate, 1,4-diacryloylpiperazine, diallyl diglycol carbonate, diallyl phthalate, diethylene glycol diacrylate, diethylene glycol dimethacrylate, diethylene glycol divinyl ether, 2,2-dimethylpropanediol dimethacrylate, dipropylene glycol dimethacrylate, divinyl glycol, divinyl sebacate, ethylene glycol diacrylate, ethylene glycol diglycidyl ether, ethylene glycol dimethacrylate, glutaraldehyde, glycerol trimethacrylate, 1,6-hexanediol diacrylate, N,N-methylenebisacrylamide, 1,3-phenylene diacrylate, 1,4-phenylene diacrylate, poly(ethylene glycol)-bisphenol A diglycidyl ether, poly(ethylene glycol) diacrylate, poly(ethylene glycol dimethacylate) poly(propylene glycol) diamethacrylate, propylene glycol diglycidyl ether, tetraethylene glycol dimethacrylate, triethylene glycol diacrylate, triethylene glycol dimethacrylate, triethylene glycol divinyl ether, triglycidyl isocyanurate, vinyl acrylate, 2,2-bis[4-(2-acryloethoxy)phenyl]propane, 2,2-bis[4-(2-hydoxy-3-methacrylopropoxy)phenyl]propane, bis(2-methacryloxyethyl)phosphate, 2,2-bis(4-methacryloxyphenyl)propane, bisphenol A, cinnamyl methacrylate, 1,10-decandiol dimethacrylate, N,N,-diallylacrylamide, diallyl fumarate, diallyl suberate, diallyltetrabromophthalate, N,N'-dimethacryloylpiperazine, divinylbenzene, glycerol tris(acryloxypropyl)ether, 1,5-hexadiene, N,N'-hexamethylenebisacrylamide, 1,6-hexandiol dimethacrylate, N,N'-octamethylenebisacrylamide, pentaerythritol triallyl ether, 1,5-pentadiol dimethacrylate, triallyl cyanurate, triallyl isocyanurate, triallyl phosphite, triallyl trimellitate, triglycidylglycerol, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, tris(2-acryloxyethyl)isocyanurate, 1,2,4-trivinylcyclohexane, 4-vinyl-1-cyclohexane dioxide, divinylpyridine, divinyl sulfone, or any other suitable molecule having multiple functionality that is capable of reacting with the first constituent to form covalent bonds or copolymerizing with monomers of the first constituent in cases where this constituent is formed by in-situ polymerization.

Thus, the cross linking of the constituents may be ionic with di- or multi-valent ions, or covalent. The embodiments discussed herein include examples of both ionic,and covalent cross-linking. The covalent cross-linking was induced by a thermal method, however, other processes could be used, as are known to those of skill in the art.

Preferably, the first constituent, the second constituent, or both, include a polyelectrolyte.

Preferably, the first polymer is a polycation, a polyanion, a polymer which can ionize in water to form polyanion or polycation, a neutral polymer or an amphoteric polymer.

In one embodiment, the first polymer is selected from the group consisting of poly(2-hydroxypropyl-1-N-methylammonium) salts, poly(2-hydroxypropyl-1,1-N-methylammonium) salts, poly(N-vinylimidazolinum) salts, poly(diallyldimethylammonium) salts, protonated or quaternized poly(N,N-dimethyl-2-aminoethyl methacrylate), poly(4-vinylpyridinium) salts, poly(vinylbenzyl ammonium) salts, poly(allylamine) hydrochloride, and polyamines such as poly(ethyleneimine), poly(allylamine) poly[N-(dimethylaminoethyl)-acrylamide], poly(allylamine), poly(vinylbenzylamines), poly(N,N-dimethylaminopropyl)-methacrylamide), and natural polyamines including poly-L-lysine which are protonated in water to form polycations.

In another embodiment, the first polymer is selected from the group consisting of acids or salts of poly(acrylic acid), poly(methacrylic acid), poly(styrene sulfonic acid), poly(vinylsulfonic acid and their salts and natural polyacids such poly(alginic acid) and chitosan and their salts.

In yet another embodiment, the first polymer is selected from the group consisting of poly(vinyl alcohol), poly(ethylene oxide), polyacrylamide, poly(vinylpyrrolidone), cellulose derivatives including cellulose acetate and natural polymers including agar-agar.

Preferably, the second polymer is a polycation, a polyanion, a polymer which can ionize in water to form polyanion or polycation, a neutral polymer or an amphoteric polymer.

In one embodiment, the second polymer is selected from the group consisting of poly(N-methyl-4-vinylpyridinium) salts, poly(acrylic acid), poly(ethyleneimine) and poly(styrene sulfonic acid).

In another embodiment, the second polymer is selected from the group consisting of poly(N-methyl-4-vinylpyridinium) salts cross-linked with ethylene glycol diglycidyl ether (EDGE), poly(acrylic acid) cross-linked with N,N-methylene-bis acrylamide, poly(ethyleneimine) cross-linked with EDGE, naphthalenedisulfonyl chloride, polypropylene glycol diglycidyl ether, or dialkylating agents, or polymers from the group of poly(styrene sulfonic acid), poly(vinylsulfonic acid) or other poly(acids), cross-linked with $Mg^{2+}$, $Ca^{2+}$ or $Ba^{2+}$ or other multivalent ions.

In another of its aspects, the present invention provides a separation device for the separation of water vapor from a gas stream, comprising:

a porous support whose pores contain a water transfer gel;

said water transfer gel including a first gel polymer and a second gel polymer which is interwoven with the first gel polymer;

the first gel polymer being different from the second gel polymer, and each being selected from the group consisting of:

polycation is selected from the group consisting of poly(2-hydroxypropyl-1-N-methylammonium) salts, poly(2-hydroxypropyl-1,1-N-methylammonium) salts, poly(N-vinylimidazolinum) salts, poly(diallyldimethylammonium) salts, protonated or quaternized poly(N,N-dimethyl-2-aminoethyl methacrylate), poly(N,N-dimethylaminopropyl)-methacrylamide), poly(4-vinylpyridinium) salts, poly(vinylbenzyl ammonium) salts, poly(allylamine) hydrochloride, and polyamines such as poly(ethyleneimine), poly(allylamine) poly[N-(dimethylaminoethyl)-acrylamide], poly(allylamine), poly(vinylbenzylamines), and natural polyamines including poly-L-lysine which are protonated in water to form polycations;

a polyanion selected from acids or salts of poly(acrylic acid), poly(methacrylic acid), poly(styrene sulfonic acid), poly(vinylsulfonic acid) and their salts and natural polyacids such poly(alginic acid) and chitosan and their salts;

a neutral polymer selected from poly(vinyl alcohol), poly(ethylene oxide), polyacrylamide, poly(vinylpyrrolidone), cellulose derivatives including cellulose acetate and natural polymers including agar-agar;

a polymer which can ionize in water to form a polyanion or polycation; or and an amphoteric polymer;

provided that the first and second polymers do not form a combination of a polyanion and a polycation.

In one of its aspects, the present invention has a pair of constituents that are 'interwoven' together. The term 'interwoven' or 'entangled' is intended to refer to topological interactions between the polymer chains of the two constituents in some cases and between the two constituents and structures of the porous support membrane itself, such as, for example, microporous poly(ethylene), poly(propylene), poly(vinylidenedifluoride), cellulose, cellulose acetate, nylon, or poly(ester) membrane supports. This entanglement is useful because it tends to hold the first and second constituent in position in the support and very largely prevents their leakage from the pores under high humidity conditions.

It is believed that interwoven features exist between the first and second constituents. The feature comes from compatibility of the constituents forming one-phase solutions in common solvents, e.g., water, and chain entanglement occurring at solution concentrations used in the preferred embodiments that exceed the overlap concentration. When the concentrations used exceed the overlap concentration the resulting entanglement would limit or greatly retard loss of the entangled constituent. This entanglement differentiates this disclosure from the inorganic salt/polymer combinations described in the Japanese Patent Document number 60-205163-A1 referred to above [15]. It is well known that for a single polymer that the viscoelastic properties particularly increase when the overlap concentration is exceeded.

While the preferred embodiment herein below is focussed on the separation of water vapor from gas streams, it will be understood that other gases may also be separated including acidic and basic gases including $SO_2$, $CO_2$, $H_2S$ and its derivatives, $NH_3$ and other low molecular weight amines while restricting the passage of neutral non-polar gases such as air, oxygen, nitrogen, methane, etc. Therefore, the characteristics governing the water transfer embodiments may also apply to the other gas transfer embodiments as well.

In one embodiment, the water transfer material restricts passage of oxygen and nitrogen or mixtures thereof including air. The water transfer material may, in addition or alternatively, restrict passage of hydrocarbon gases or mixtures including hydrocarbon gases. Those gases may include those of the chemical structure $C_nH_m$ where n=1 to 5 and m=4 to 12. Examples include methane, ethane, propane, butane, pentane, their isomers and unsaturated analogs such as ethene, propene, etc.

Preferably, the membrane has a pair of opposing surfaces and is capable of allowing water vapour to pass through the membrane from one surface to the other. Alternatively, the membrane may have one surface through which water vapour passes to enter the membrane. In other words, the present invention is not limited to those membranes were the separated gas enters one surface and leaves an opposing surface of the same membrane. Instead, there may be cases where the gas enters one surface and is transferred laterally through the membrane or instead is retained in the membrane. In addition, it is contemplated that the membranes formed herein may also be sandwiched between two other membranes, for example where a central membrane bearing the water transfer material is located between an upper layer or a lower layer of the same or different material. In this case, either or both of the upper and lower layers either may or may not also include the water transfer material.

Preferably, the support membrane includes paper, porous polyolefin, or nonwoven or woven polyester fabrics, polysulfones, polycarbonates, nylons, cellulose, cellulose acetate or porous ceramics and glasses. The support membrane may be flat, curved or tubular. In the latter case, the support membrane includes a hollow tube or a hollow fibre material.

In another of its aspects, the present invention provides a separation device comprising a porous membrane whose pores contain a water transfer material, the water transfer material including a first cross-linked hydrophilic constituent and a second constituent which is interwoven with the first constituent without deliberate cross-linking or chemical bonding between the first and second components or constituents.

In still another of its aspects, the present invention provides a separation device comprising a porous membrane containing in the pores an essentially continuous layer of a water transfer material whose thickness is equal to or smaller than the thickness of the porous membrane and wherein the water transfer material includes a first cross-linked hydrophilic component and a second component which is interwoven with the first component.

In yet another of its aspects, the present invention provides a separation device comprising a porous support containing, in its pores, a water transfer material, the water transfer material including a first cross-linked hydrophilic constituent and at least one other constituent which is interwoven with the first constituent, wherein the membrane is operable to transfer water vapour from one side of the membrane to another and to expose substantially all of the water vapour to the water transfer material.

In other words, the water transfer material need not occupy the entire pore-volume of the support to be effective. Rather, the water transfer material may only occupy a fraction of the pores of the porous support material provided that no continuous path through the membrane exists whereby gases may pass without encountering the water transfer material.

In still another of its aspects, there is provided a method of forming a separation device comprising the steps of:

preparing a water transfer material formulation by blending a first polymer with a second polymer in a solution to effect an entanglement between chains of the first polymer and chains of the second polymer;

providing a porous support having a plurality of pores;

filling at least some length of the pores with the formulation; and subjecting the formulation in the pores to conditions causing the first polymer to cross-link to from a gel.

Preferably, the first polymer is hydrophilic and, following the subjecting step, the second polymer remains entangled with the first polymer. However, there are alternatives to this case. For example, the entanglement may be enhanced by a minor degree of cross linking between the first and second constituents, for example less than 1 percent, or a low-degree of independent cross linking of the second constituent while not otherwise significantly impairing the water transfer kinetics of the water transfer material.

In one embodiment, the preparing step includes the steps of:

adding, to the formulation, either a first catalytically activated cross-linker for the first polymer or a first cross-linking catalyst; and, prior to the filling step;

depositing, in the pores of the porous support, the other of the first catalytically activated cross-linker of the first polymer or the first cross-linking catalyst.

In another embodiment, the preparing step includes:

adding, to the formulation, a first cross-linking agent for the first polymer.

In still another embodiment, the preparing step includes the step of depositing, in the pores of the porous support, a first cross-linking agent to cross-link the first polymer.

In this case, the cross-linking catalyst may or may not become part of the water transfer material. It is beneficial when the cross linking catalyst becomes part of the water transfer material because no additional treatment to remove it from the membrane is required. In one embodiment, the catalyst is selected to be the same as the second component of the water transfer material with the only difference being the ionic form.

In embodiment, the method may further comprise the step of cross-linking the second polymer.

In another embodiment, the preparing step includes the steps of:

adding, to the formulation, either a second catalytically activated cross-linker for the second polymer or a second cross-linking catalyst; and, prior to the filling step;

depositing, in the pores of the porous support, the other of the second catalytically activated cross-linker of the second polymer or the second cross-linking catalyst.

In yet another embodiment, the preparing step includes:

adding a second cross-linking agent to the formulation to cross link the second polymer.

In still another embodiment, the preparing step includes the step of depositing, in the pores of the porous support, a second cross-linking agent to cross-link the second polymer. The porous support may include a membrane or other structures including or made from a porous material, such as fins on water vapor exchange devices and the like, as well as other relatively bulky structures, bearing in mind that the transport of water into and through such structures will be relatively slower owing to the increased thickness.

The formulation may be delivered to within the pores of the porous support in a number of ways. For example, when the porous support is a membrane, the formulation may be squeezed into the membrane by applying the formulation liberally on one surface of the membrane and then using the squeezing action of a pair of opposed rollers or plates, by saturating the membrane with the formulation, of by immersing the membrane into the formulation fluid, provided that the viscosity of the latter is sufficiently low to ensure that the formulation is delivered to within the pores of the membrane, or by spraying the formulation. Increasing the temperature of the formulation can decrease its viscosity and facilitate delivery.

In still another of its aspects, the present invention provides a method of forming a separation device comprising:

a step for preparing a water transfer material by forming a mixture of a first component and a second component and subjecting the mixture to conditions to entangle the first and second components;

a step for providing a membrane having a porous membrane;

a step for depositing the water transfer material, at least part way through the porous membrane, and a step for cross-linking the first component in the membrane.

It is important that, in the preparing step, the entanglement or cross linking does not occur in the water transfer material formulation to a degree that would otherwise impair the ability for the water transfer material to be deposited in the pores in the depositing step. Therefore, the cross linking step should be carried out after the depositing step and cross linking prior to this step should be minimized.

In the following method, and indeed elsewhere herein, the terms first and second components are used. In many respects it would make no difference which is defined as the first and second. A membrane with the same composition in some cases can be obtained if the order were switched.

In still another aspect, the present invention provides a method of forming a separation device comprising:

a step for preparing a water transfer material by forming a mixture of a first component and a suitable cross-linking agent, a monomer of a second component, with or without a di- or multi-functional monomer capable of co-polymerization with the monomer of the second component;

a step for providing a membrane having a porous membrane;

a step for depositing the water transfer material, at least part way through the porous membrane, and a step for cross-linking the first component in the membrane and polymerization of the second component.

The formulation of the water transfer material may, for example, include a mixture including a plurality of polymers, for example a mixture in which all of the polymers are hydrophilic.

In a further embodiment the filling solution contains at least two polymers and at least two cross-linking agents such that two substantially independent, intermeshed networks are formed within the pores. An example of this involves poly(vinyl alcohol) cross-linked with glutaraldehyde, combined with poly(styrenesulfonic acid) cross-linked with $Ca^{2+}$.

In another of its aspects, the present invention provides a method of forming the devices which involves pre-coating the porous support membrane with a mixture of the first and the second components as defined hereinabove and a cross linking catalyst (if required), drying it, and then filling the membrane with a solution of one or both cross linkers for the fabrication of the gel, thereby providing a relatively simple fabrication protocol, as will be described.

In yet another of its aspects, the present invention provides a gas separation device comprising a porous membrane whose pores contain a gas transfer material including a first hydrophilic component and a second component which is interwoven with the first component, the transfer material being operable to allow polar gases to pass through the pores in contact with the hydrophilic material but restricting the passage of other gases including nitrogen or oxygen.

The polar gases may include acidic gases that include, for example, $CO_2$ and $H_2S$, and basic gases that include, for example, $NH_3$, among others. It may be preferable that these gases when dissolved in water be either moderately acidic or moderately basic, for example in a pH ranging from about 3 to about 11.

Preferably, the gas separating material is operable to transfer water vapor and/or polar gases and, therefore, both polymeric components are hydrophilic.

In still another of its aspects, there is provided a separation device comprising a porous support, whose pores contain a water transfer material, the water transfer material including a first cross-linked hydrophilic component and at least one other constituent which is interwoven with the first constituent. In this case, the water transfer material may include two or more other constituents. For example, there may be some advantages in providing three constituents, the first and second as mentioned above and a third that has the capacity to impart still further advantages to the material, either by improving the water transfer kinetics of the water transfer material or improving the anchoring of the materials to the support or otherwise improve its insolubility in water while enhancing its hydrophilicity.

In still another of its aspects, there is provided a microporous gas separation membrane comprising a microporous mechanical support having a continuous band of pores filled with a water transfer material, the material including a first cross-linked hydrophilic constituent and at least a second constituent which is interwoven with the first constituent, the water transfer material being substantially confined to within the support.

Preferably, there is essentially no gel on the outer surface of the membrane. More preferably, the membrane has a pore volume which is essentially entirely filled with gel, though other configurations are also contemplated as will be described.

In yet another of its aspects, there is provided a material composition useful for the fabrication of gas separation membranes, comprising a first cross-linked hydrophilic constituent and at least a second constituent which is entangled with the first cross-linked constituent.

In yet another of its aspects, there is provided a separation device for the separation of water vapour from a gas stream, comprising a water vapor separation membrane having a porous support, whose pores contain a water transfer material, the water transfer material including a first hydrophilic constituent and a second constituent, wherein the water transfer material has an average water uptake of 1 wt-% to 30 wt-%, at a relative humidity of 50 percent.

Preferably, the water transfer material has an average water uptake of 5 wt-% to 30 wt-% and more preferably, 10 wt-% to 30 wt-% at a relative humidity of 50 percent. It is known in the art that the efficiency of water vapor transport through a membrane is related to its water content. [19]

A particular feature of one embodiment of the present invention is that the second constituent has, in some cases, the effect of increasing the water uptake capability of the water transfer material, while being retained within the porous support. Thus, the host support provides the mechanical strength and containment for the water transfer material. One such embodiment involves a composition of the water transfer material, that includes a neutral polymer and a polyelectrolyte, the composition comprising a mixture of poly(vinyl alcohol) cross-linked with glutaraldehyde, combined with poly(styrenesulfonate) with various counterions. A particular feature of this embodiment is the fact that the amount and the ionic form of the poly(styrene sulfonate) component can be modified to vary the properties of the membranes. Table 1 below shows the increase in water uptake as a function of the amount of the second component in the system, i.e., poly(styrenesulfonate) in three different ionic forms. The water uptake increases linearly with the increased content of poly(styrene sulfonate). The proton form of the polymer shows the highest water uptake while the calcium form shows the lowest water uptake.

TABLE 1

| Poly(styrenesulfonate) Content in Water Transfer Material | Water Uptake (wt %) at 50% Relative Humidity by Water Transfer Material with Poly(styrenesulfonate) in Ionic Form of: | | |
|---|---|---|---|
| % | Proton | Sodium | Calcium |
| 0 | 4 | 4 | 4 |
| 20 | 6.5 | 6.2 | 5.7 |
| 40 | 10.1 | 9.5 | 9.2 |
| 60 | 14.8 | 13 | 11.4 |

The water uptake depends also on the air relative humidity but the relative increase of water uptake with increase in humidity is substantially higher for the poly(styrenesulfonate)-containing material than that for poly(vinyl alcohol) only, Table 2.

TABLE 2

| | Water Uptake (%) by Water Transfer Material Composed of: | | | |
|---|---|---|---|---|
| Relative Humidity | Poly(vinyl alcohol) | 40 wt % of poly(vinyl alcohol) and 60 wt % of Poly(styrenesulfonate) in the Ionic Form of: | | |
| % | | Proton | Sodium | Calcium |
| 24 | 2 | 3.7 | 3.6 | 2.8 |
| 55 | 4 | 14.8 | 13 | 11.4 |
| 75 | 9.2 | 25.2 | 22.5 | 21.7 |
| 98 | 26.9 | 56 | 56.7 | 54.1 |

A trade-off can be seen between membrane selectivity, measured as a ratio of the standard water vapour permeance to the nitrogen permeance by dry membrane, and the water vapour permeance as-the content of the second component and, thus, the affinity to water, in the water transfer material is increased. This is illustrated by the results obtained for membranes containing poly(vinyl alcohol) cross linked with glutaraldehyde and poly(sodium styrene sulfonate), Table 3. At the very high content of the second component (80 wt-%) or in the absence of the first component, the nitrogen permeance is higher than the water permeance (selectivity less than 1).

TABLE 3*

| PStSO$_3$Na/PVA Ratio in Water Transfer Material | Nitrogen Permeance of Dry Membrane (STP)cm$^3$/cm$^2$ s cmHg | Membrane Water Vapour Permeance (STP)cm$^3$/cm$^2$ s cmHg | Selectivity (Water Vapour Permeance/Nitrogen Permeance) |
|---|---|---|---|
| 0/100 | 6.5 × 10$^{-6}$ | 5.9 × 10$^{-4}$ | 91.4 |
| 20/80 | 1.0 × 10$^{-5}$ | 8.3 × 10$^{-4}$ | 83.5 |
| 40/60 | 2.6 × 10$^{-5}$ | 9.6 × 10$^{-4}$ | 36.7 |
| 60/40 | 4.5 × 10$^{-5}$ | 1.1 × 10$^{-3}$ | 24.6 |
| 80/20 | 2.1 × 10$^{-3}$ | 1.2 × 10$^{-3}$ | 0.6 |
| 100/0 | 2.3 × 10$^{-2}$ | 1.1 × 10$^{-3}$ | 0.05 |

*PStSO$_3$Na = sodium salt of poly(styrenesulfonic acid); PVA = poly(vinyl alcohol)

Another particular feature of this embodiment is the fact that the ionic form of the poly(styrene sulfonate) component can be modified to vary the stability of the membranes when they are in contact with water. For example, using $Ca^{2+}$ as the cation very significantly increases this stability. Such $Ca^{2+}$ salt-containing water transfer materials provide a useful type of membrane because they have two independent cross-linked networks in the same gel filling.

Preferably, the membrane has a thickness ranging incrementally from about 20 micrometers to about 150 micrometers. However, there are other dimensions that may also apply depending, of course, on the type of membrane employed.

Thus, the present invention may be used in a number of applications where water vapor or other gases are to be separated from a gas stream, such as in a heating, ventilating and air conditioning (HVAC) device. Such devices may be used in stationary structures such as buildings or mobile structures such as vehicles, including passenger vehicles, for example automobiles and recreational vehicles. In the latter case, the device may be used for cooling of the passenger or freight compartment or may be used to condition the air stream entering the motor. This latter application sees potential for use in fuel cells, for example. Still another application is that of heat-and-moisture exchangers.

In yet another of its aspects, the present invention provides a heat and moisture exchanger for the separation of heat and water vapor from a gas stream, comprising a water vapor separation membrane having a porous support membrane whose pores contain a water transfer material, the water transfer material including a first water absorbent constituent and a second constituent which is interwoven with the first constituent to improve water transfer.

Preferably, gel has a density ranging from about 0.25 to about 1.5 g/cm3 at a relative humidity of 50%. For example, gels made according to several of the examples below have apparent densities ranging from about 0.9 to 1.4 g/cm3 at a relative humidity of 55%, while another gel had an apparent density of 0.32 g/cm3.

BRIEF DESCRIPTION OF THE DRAWINGS

Several preferred embodiments of the present invention will be provided, by way of example only, with reference to the appended drawing, wherein.

DESCRIPTION OF THE PREFERRED EMBODIMENTS

Figure 3:
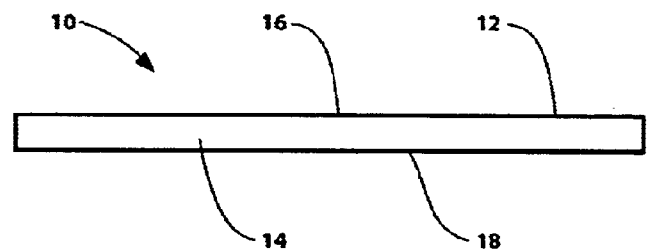
FIG. 3 is a side view of a separation device.

Referring to the figures, particularly FIG. 3, there is provided a separation device 10 comprising a porous support member 12, in this case in the form of a membrane. The membrane 12 has an inner pore volume 14 which is bordered by a pair of outer surfaces 16, 18 and a pair of end surfaces. The membrane is shown as being 'thick', it being understood that, in the preferred form, the membrane is 'thin' according to the dimensions set out herein.

Figure 4:
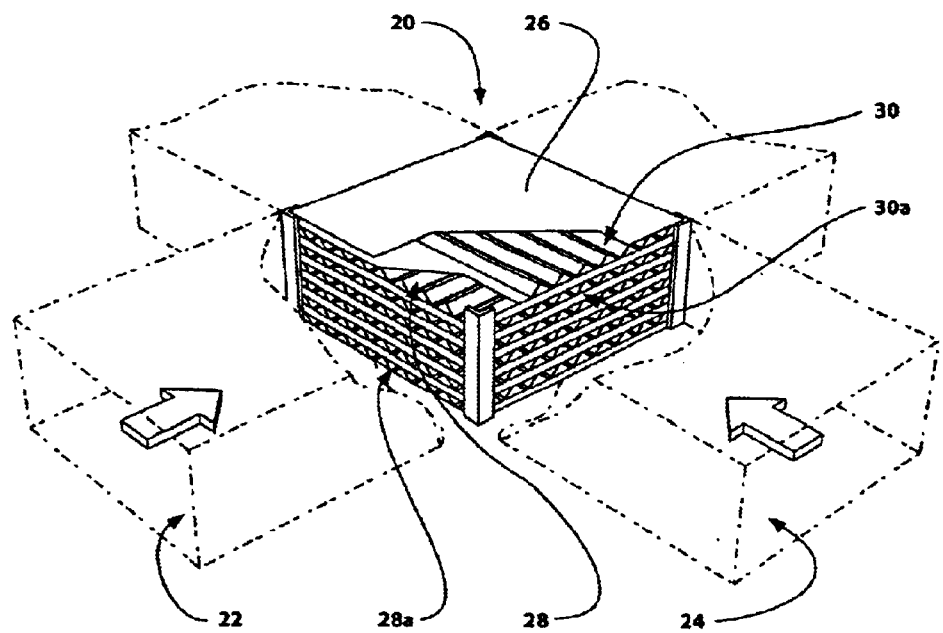
FIG. 4 is a schematic perspective view of another separation device.

Membranes of this type are useful for a variety of applications, such as air to air water and/or heat separation devices, such as the device shown schematically at 20 in FIG. 4. In this case, the device 20 is provided with a pair of air ducts 22, 24, where one of the ducts is operable to direct stale air from an interior space to the outside and the other of the ducts is operable to bring in fresh air from outside to the interior space. The ducts meet at an intersection containing a separation module 26. The separation module has a plurality of alternating panels 28, 30 to provide a matrix of passages 28a, 30a in line with the corresponding ducts. In this case, the panels are versions of membranes made according to the methods and characteristics herein described which are separated by corrugated spacers.

As will be described below, membranes made as described herein are capable of yielding one or more of the following characteristics:

WATER UPTAKE: (specified here for the water uptake material, the membrane water contents will vary depending upon the porosity and specific density of the support) 1 to 30 weight % water at 50% relative humidity, preferably, 5 to 30% and still more preferably 10 to 30%;

WATER VAPOUR PERMEANCE: (specified for a membrane based on a polyester support, the numbers will change if the % of water uptake material changes in the membrane.) $1 \times 10^{-4}$ to $1 \times 10^{-2}$ (STP)cm$^3$/cm$^2$ s cmHg, preferably $6 \times 10^{-4}$ to $1 \times 10^{-2}$, still more preferably $1 \times 10^{-3}$ to $1 \times 10^{-2}$;

NITROGEN PERMEANCE: (expressed in terms of a polyester based membrane) $1 \times 10^{-7}$ to $1 \times 10^{-4}$, preferably, $1 \times 10^{-7}$ to $1 \times 10^{-5}$, still more preferably, $1 \times 10^{-7}$ to $5 \times 10^{-6}$ (STP)cm$^3$/cm$^2$ s cmHg;

APPLICABLE PRESSURE RANGE 0–1,500 kPa, preferably 0 to 1000 kPa, still more preferably 0 to 500 kPa;

APPLICABLE HUMIDITY RANGE 1–100% RH, preferably 30 to 100% RH, still more preferably 40 to 90% RH;

It has been found that by cross-linking hydrophilic polymeric absorbents such as poly(vinyl alcohol) in the pores of a porous support, the leak of the absorbent from the membrane can be substantially reduced, or in some cases prevented, even at high pressures, e.g., 500 kPa (about 70 psig) or higher. In order to improve the transfer rate of polar gases such as water vapor while restraining the transport of neutral gases such as nitrogen, oxygen, methane, etc. through the membrane, one or more additional polymeric components are introduced to the pore filling absorbent. Unlike the low molecular weight hygroscopic additives such as inorganic salts referred to in the prior art, particularly, in Japanese Pat. 60-205163 A1, these additional components are entangled with the first hydrophilic absorbent due to topological interactions.

The hydrophilic polymeric absorbent and the additional polymeric component form a two component system. The stability of the two component system can also be further enhanced, in one embodiment, by independently cross-linking both the second component and the first component, as will be described below. The leak of the components at high pressures and/or high humidity is therefore believed to be prevented, or at least minimized, by cross-linking while the water vapour transport rate through the membranes containing a two- or a multi-component water transfer material is increased, in some cases, by a hundred or more percent as compared to the membranes with a single cross-linked hydrophilic absorbent.

The formation of entanglements or interpenetrating gel networks has been previously utilized to enhance the mechanical properties of polymeric materials. For example, Yonese et al. [20] have reported that viscoelestic properties and water permeability of biocompatible hydrogels such as calcium alginate can be improved by combining the alginate with poly(vinyl alcohol) to form either a snake-cage type hydrogel in which network of one polymer traps other free polymer chain, or interpenetrating gels in which both polymers form interpenetrative networks. In the present invention, both the snake-cage type of gels and the interpenetrating gel networks are applied to obtain materials with high water sorption capacity suitable for incorporation into a water vapour transport membrane.

It is important that the first and second polymer components be compatible with one another to form the entanglements or, when both the first and second components are independently cross linked, an interwoven mesh. Desirably, at least one of the first and second components is hydrophilic, though the water transfer material may contain hydrophobic components in some cases.

The entanglement condition indicates that both components are polymers. As a result, the polymers can form a mixture that can subsequently be deposited in the pores if at least one of the polymers is a liquid and the other polymers are soluble in it. Otherwise, a solvent common to both is needed. However, one or both of the polymers may, if desired, be formed in situ by depositing one or both in the membrane together with cross linking agents, or as the case may be, as will be described below.

As will be described, in one embodiment, the present invention provides composite gas separation membranes in which the water vapour separating component is a neutral cross linked polymer gel containing a second component which is a polyelectrolyte entangled with the gel mesh of the first component or forming a network on cross linking which is interwoven with the mesh of the first component. The separating gel is produced inside the pores of and is entangled with the elements of a microporous support membrane and, in one example, is filling the pores substantially throughout the whole membrane thickness. However, in other embodiments, the separating gel only partially fills the thickness. Since the separation is performed by the gel filling the pores of the support (and not by a thin dense layer on the membrane surface), the gel is protected by the pore walls resulting in the membranes which are not susceptible to abrasion or mechanical damage. Additionally, the gel confinement in the pores restricts its swelling under high humidity conditions thus providing the membranes of this invention with dimensional stability. In other words, the dimensions of the membrane should not change considerably in the presence of water or water vapor and the pore-filling material is not exuded from the pores under pressure and/or high humidity conditions.

Among its advantages, one embodiment of the present invention has the benefit of providing a broadly applicable method for producing such membranes that requires no organic solvents and minimizes the use of volatile organic compounds. Membranes made according to he present invention can be made with inexpensive starting materials.

As described in detail below composite membranes, for water vapor exchange between gas streams, are provided and which comprise a porous mechanical support whose pores are filled with hydrophilic gels allowing the water vapor to pass through the membrane while effectively blocking the passage of other gases and vapours. The membranes can have a thickness ranging from about 20 micrometers to about 150 micrometers, for example.

The composite membranes may be prepared by imbibing an aqueous solution of suitable hydrophilic polymer or mixtures of polymers into the pores of a porous support and subsequently covalently or ionically cross linking at least one of the polymers.

While the present invention is particularly useful with water, it is believed that the properties of the membranes may be tuned for separation of other polar gases such as acidic gases ($CO_2$, $H_2S$) or basic gases such as $NH_3$, etc. from non-polar gases such as oxygen, nitrogen, methane, etc., and their mixtures.

The methods described herein may be useful in a number of applications, such as in heating, ventilation and air conditioning (known as "HVAC") areas, for example by allowing effective water exchange between entering and exiting air flows in buildings and, accordingly, the transfer of latent heat resident in the water vapor, as well as conductive heat transfer between the intercrossing air flows in such systems. The invention may also be used in HVAC dehumidification equipment and other gas de-watering applications such as air feeds for the production of ozone for water treatment applications or in the adjustment of the humidity of gas streams including those used in fuel cells.

Membranes according to the present invention may, in some cases, be relatively inexpensive to produce, strong, and have relatively higher water throughput and lower air leakage than existing coated paper based products, for example. The membranes are particularly beneficial with pore sizes ranging from 0.1 to 100 $\mu$m.

Figure 5:
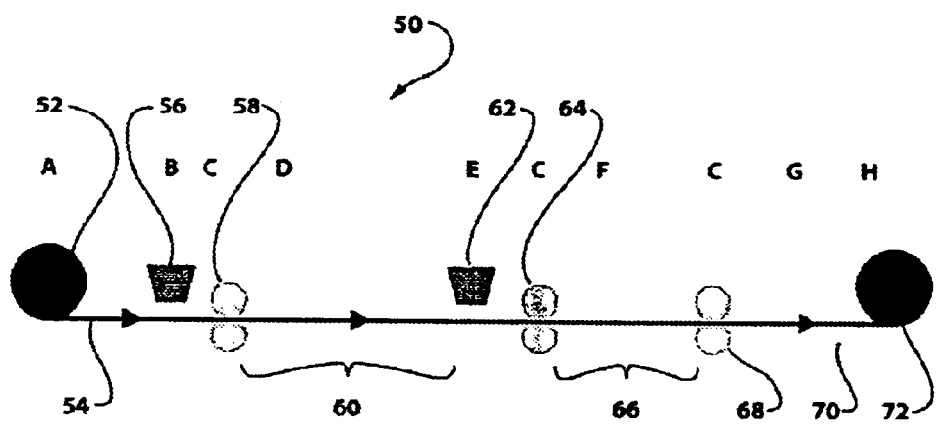
FIG. 5 is a schematic diagram of a method of forming a separation device.

A production line is shown at 50 in FIG. 5 to produce several versions of the device as described herein. The line includes a roll of porous membrane material 52 at an upstream location on a path 54 which carries the membrane through the production line. Downstream of the roll 52 is an applicator 56 to apply a polymeric strong acid catalyst or another agent as described herein such as a cross linking agent.

Downstream of the applicator 56 is a pair of opposed rollers 58 to press the acid catalyst into the pores of the membrane. Downstream of the rollers 58 is a drying region 60 whose length is determined in order to provide sufficient drying of the catalyst on the membrane. This will depend, as well, on the speed of the membrane along the path 54.

Downstream of the drying region 60 is another applicator 62 to apply the water transfer material formulation to the membrane. Another pair of rollers 64 follows the applicator 62 to press the water transfer material into the pores of the membrane. The rollers 64 may, if desired, also be heated to facilitate the curing process. A curing region 66 follows the rollers 64 with a length sufficient to complete the polymerization or cross linking as the case may be, depending on the reagents selected in the water transfer material and the formation regime for the particular device being made. Another pair of rollers 68 (which may also be heated if desired) follows the curing region 66 and a drying region 70 follows the rollers 68 to dry the membrane (the length of the region again depending also on the speed of the membrane along the path 54). Finally a collection roll 72 collects the coated membrane.

The applicator 56 will not be necessary in cases where the membrane is not precoated with catalyst or another agent prior to applying the water transfer material formulation. The production line may also be used for forming other gas separation devices.

Referring to FIG. 5, porous supports, useful as or in gas separation devices may be made as follows. First the support, in this case a membrane, is coated with a cross-linking catalyst that is chosen such that it becomes part of the formulation once the membrane fabrication is complete, such as poly(styrenesulfonic acid). The catalyst is a polymeric material and thus provides the additional benefit of being retained in the final membrane, while augmenting the poly(styrenesulfonic acid salts) used in the filling formulation.

Second, the polymeric material formulation is applied to the coated membrane prior to cross-linking. The polymeric material formulation may, for example involve a mixture of poly(vinyl alcohol) for later cross-linking by glutaraldehyde (under the action of the cross-linking catalyst already in the porous support by the first step) and sodium poly (styrenesulphonate) along with calcium chloride (as in example 3).

In both steps the filling/coating of the membrane is carried out by passing the membrane through a set of rollers so as to facilitate an even distribution. In the second step 2, these rollers may be heated so as to speed the curing process.

Embodiments of the present invention will be described with reference to the following Examples which are presented for illustrative purposes only and are not intended to limit the scope of the invention. Rather, the range of materials represented should provide an indication of the breadth of suitable options.

Experimental
Materials Used

The polymers used were poly(vinyl alcohol) 80% hydrolyzed, Mw 9,000–10,000 (Aldrich) and 88% hydrolyzed, Mw 78,000 (Polysciences, Inc.), poly(4-vinylpyridine) Mw 150,000–200,000 (Polysciences, Inc.), poly(sodium 4-styrenesulfonate) Mw 70,000 (Aldrich) poly (styrene sulfonic acid) (30% solution in water) Polysciences Inc. The monomers used were acrylic acid (Avocado) and N,N-methylenebisacrylamide (Aldrich). Ethylene glycol diglycidyl ether (Polysciences, Inc.) and glutaraldehyde (50% aqueous solution, Sigma) were used as cross-linkers. Other chemicals used were 1M HCl, 0.5 M. 1M $H_2SO_4$, 1.8 M calcium chloride prepared from reagent grade chemicals supplied by Fisher Company.

Porous supports used included filter paper Nos. 40, 41, and 42 (Whatman), non-woven polyester substrate style 45002 (Powell Corp.), non-woven ultra high density polyethylene (DSM Solutech), and porous poly(vinylidene fluoride) (Millipore).

Membrane Preparation

The membranes were manufactured according to the following general procedure. A weighed sample of a substrate was placed on a polyethylene sheet and a suitable formulation of the water transfer material was applied to the sample. The sample was subsequently covered with another polyethylene sheet and the sandwich was run between two rubber rollers to press the formulation into the pores and remove an excess of it. The sample was left between polyethylene sheets until the cross-linking reaction and gel formation was completed. The resulting gel-filled membrane was dried at ambient temperature and humidity to constant weight. The mass of the incorporated gel was determined from the difference between the dry mass of the pore-filled membrane sample (dried in vacuum at room temperature to a constant mass) and that of the substrate. The obtained membranes were characterized by the measurements of nitrogen permeance and water vapor permeance.

Nitrogen Permeance Measurements

Nitrogen permeance measurements were carried out with membranes dried at ambient temperature and humidity. A membrane sample in a form of a disk of diameter 7.8 cm was mounted on a sintered grid of 3–5 mm thick in a cell supplied with dry nitrogen at controlled pressure. The rate of nitrogen passing through the membrane was measured with a set of glass flow meters (Bell Art). All experiments were carried out at the room temperature and atmospheric pressure at the permeant outlet. Each measurement was repeated two or more times with a reproducibility ±5%.

The nitrogen permeance, $P_N$ (STPcm$^3$/cm$^2$ s cmHg), was calculated from the following relationship:

$$P_N = \frac{Q}{A\Delta P}$$

where Q (cm$^3$/s) is the reading of a flow meter corrected to the standard conditions of 0° C. temperature and 1 bar pressure, A (cm$^2$) is the membrane surface area, and $\Delta P$ (cm Hg) is the pressure difference across the membrane.

Water Vapour Permeance Measurements

Water vapour permeance through the membranes was measured by the standard cup method (ASTM E96-92, Procedure B). A membrane sample dried at ambient temperature and humidity (active area of 33.2 cm$^2$) was affixed on a mouth of a container partially filled with water so the distance between the membrane and the water surface was about 2 cm. The container with water and affixed membrane was weighed and placed in a chamber with circulating air maintained at constant relative humidity of 50% and at constant temperature of 35° C. The container was weighed at 12 hrs intervals. At least 5–7 measurements were taken until the constant value of the water vapour permeance was obtained. The water vapour permeance, $P_V$(cm$^3$/cm$^2$ s cmHg), was calculated as follows:

$$P_V = \frac{V\Delta G/M}{A\Delta Pt}$$

where V (cm$^3$) is the standard volume of 1 mol of gas, $\Delta G$ (g) is the mass change of the container in the time interval, M (g/mol) is the molar mass of water, A (cm$^2$) is the membrane surface area, $\Delta P$ (cmHg) is water vapor pressure difference across the membrane, and t (s) is the time interval.

Membrane Selectivity

Membrane selectivity was defined as a ratio of the water vapour permeance to the nitrogen permeance, both measured as described above.

Measurements of Water Vapour Uptake by Water Transfer Materials

Samples of a water transfer material was prepared by casting the material formulation onto a glass plate with a casting knife and the plate was placed in a chamber at 35° C. and 55% relative humidity for at least 24 hours. After that, the material was removed from the glass, cut into squares of 9 to 16 cm$^2$, and placed in a chamber with controlled temperature and humidity for 3–4 days for the sample to equilibrate. The squares were subsequently weighed in closed vials and returned to the chamber for a day or two. The weighing was repeated and samples returned to the chamber until a constant weight was reached. After all measurements were completed, the samples were dried in vacuum at room temperature to constant weight.

The water uptake, WU (%), was calculated as follows:

$$WU = \frac{m_w - m_0}{m_0} 100\%$$

where $m_w$ is the mass of the sample equilibrated with the water vapour at a given humidity and $m_0$ is the mass of the dry sample.

EXAMPLE 1

This example illustrates one method of making the membranes of this invention. The water transfer material in this example is composed of a neutral polymer (poly(vinyl alcohol) covalently cross-linked with glutaraldehyde) as a first component and a polyanion (poly(sodium styrenesulfonate)) as a second component.

A water transfer formulation containing 40 parts by weight of a 15 wt-% aqueous solution of poly(vinyl alcohol), 30 parts by weight of 30 wt-% aqueous solution of poly (sodium styrenesulfonate), and 0.55 to 0.82 parts by weight of a 50 wt-% solution of glutaraldehyde (cross linker) in water was prepared by mixing. A 0.5 N aqueous solution of sulfuric acid used as a cross linking catalyst was subsequently stirred into the formulation in an amount of 0.25 gram per each gram of the formulation. A non-woven polyester substrate of a thickness in the range of 0.0100 to 0.0108 cm, having average porosity in the range of 20–30 vol-%, was placed on a polyethylene sheet and the formulation was spread evenly over it. The substrate was subsequently covered with another polyethylene sheet and the sandwich was run between two rubber rollers to press the formulation into the pores and remove excess formulation. The filled substrate was allowed to stand at room temperature for 20–30 min for the cross linking process to occur. After that, the membrane was removed from between the polyethylene sheets, left to dry at ambient temperature and humidity for about 40 min, and stored in a polyethylene bag. The substrate gained 21–23% of the original weight in this treatment. The membranes produced by this method had the permeance to nitrogen in the range of $3.8\times10^{-5}$–$7.7\times10^{-5}$ STPcm$^3$/cm$^2\cdot$s$\cdot$cmHg and the permeance to water vapour in the range of $1.1\times10^{-3}$–$1.2\times10^{-3}$ STPcm$^3$/cm$^2\cdot$s$\cdot$cmHg.

EXAMPLE 2

This example illustrates a modification of the general membrane making procedure in which the cross linking catalyst is applied to the porous membrane substrate prior to the filling step with the polymer formulation. This extends the life time of the formulation from about 15 minutes to several months.

The pore-filling formulation containing 30 parts by weight of 30 wt-% aqueous solution of poly(sodium styrenesulfonate), 40 parts (by weight) of a 15 wt-% aqueous solution of poly(vinyl alcohol) and 0.55 to 0.82 parts by weight of a 50 wt-% solution of glutaraldehyde (cross linker) in water was prepared as described in EXAMPLE 1. No acid catalyst was added to the formulation. Instead, the polyester substrate of EXAMPLE 1 was filled with a 5 wt-% aqueous solution of an acid catalyst in the form of poly (styrene sulfonic acid) (in a manner similar to that used to fill the substrate with the formulation in Example 1) and dried at room temperature to result in the substrate being coated with 3.5–3.7 wt-% of poly(styrenesulfonic acid) added on to the substrate weight. The water transfer formulation was subsequently applied to the coated substrate in the same manner as described in EXAMPLE 1. The substrate filled with the formulation was left sandwiched between two polyethylene sheets at room temperature for 20–30 min and, then, dried at ambient temperature and humidity for about 40 min, and stored as in EXAMPLE 1. The substrate gained 21–23% of the original weight in this treatment. The membranes produced by this method had a permeance to nitrogen in the range of $1.0\times10^{-7}$ to $7.0\times10^{-5}$ STPcm$^3$/cm$^2\cdot$s$\cdot$cmHg and the permeance to water vapour in the range of $1.1\times10^{-3}$–$1.2\times10^{-3}$ STPcm$^3$/cm$^2\cdot$s$\cdot$cmHg.

EXAMPLE 3

This example illustrates another modification of the general membrane making procedure which incorporates the catalyst coating process described in EXAMPLE 2 and introduces an ionic cross linking of the second component of the water transfer material.

First, 30 wt-% aqueous solution of poly(sodium styrenesulfonate) was modified by addition of calcium chloride in the amount equivalent to 0.5 mole of calcium per one mole of styrene sulfonate monomer in the poly(sodium styrenesulfonate). The water transfer formulation was prepared by mixing 30 parts (by weight) of the modified poly(styrenesulfonate) solution with 40 parts by weight of 15 wt-% aqueous solution of poly(vinyl alcohol), and 0.55 to 0.82 parts by weight of 50 wt-% aqueous solution of glutaraldehyde. The non-woven polyester substrate of EXAMPLE 1 was coated with poly(styrenesulfonic acid) according to the procedure described in EXAMPLE 2, filled with the formulation, and left sandwiched between two polyethylene sheets for 20–30 min. The resulting membrane was dried at ambient temperature and humidity as described in EXAMPLE 1 and stored in a polyethylene bag. The substrate gained 21–23% of the original weight in this treatment.

Membranes produced by this method had the nitrogen permeance in the range of $1.4\times10^{-6}$ to $8.0\times10^{-5}$ STPcm$^3$/cm$^2\cdot$s$\cdot$cmHg and the water vapour permeance of $1.2\times10^{-3}$ to $1.3\times10^{-3}$ STPcm$^3$/cm$^2\cdot$s$\cdot$cmHg.

EXAMPLE 4

This example illustrates the use of different composition of the water transfer material that contains uncross-linked polycation (poly(4-vinylpyridinium hydrochloride)) as the second component.

The water transfer formulation was prepared by mixing 50 parts by weight of 10 wt-% aqueous solution of poly (vinyl alcohol) with 50 parts by weight of 10 wt-% aqueous solution of poly(4-vinylpyridine) solubilized in water by protonation with hydrochloric acid, and 0.7 parts by weight of 50 wt-% aqueous solution of glutaraldehyde. The formulation was subsequently acidified by adding 0.25 g of 0.5 N hydrochloric acid solution per each gram of the formulation and applied to the non-woven polyester substrate. The substrate filled with the formulation was left sandwiched between two polyethylene sheets at room temperature for 2 hours and, then, dried at ambient temperature and humidity for about 40 min, and stored as in EXAMPLE 1. The substrate gained 10–12% of the original weight in this treatment. The membrane produced according to this procedure had the nitrogen permeance of $7.4\times10^{-4}$ STPcm$^3$/cm$^2\cdot$s$\cdot$cmHg and the water vapour permeance of $1.1\times10^{-3}$ STPcm$^3$/cm$^2\cdot$s$\cdot$cmHg.

EXAMPLE 5

This example illustrates the use of water transfer material that contains uncross-linked neutral polymer and covalently cross-linked polyelectrolyte (polycation).

The water transfer formulation was prepared by mixing 50 parts by weight of 10 wt-% aqueous solution of poly (vinyl alcohol) with 50 parts by weight of 10 wt-% aqueous solution of poly(4-vinylpyridine) solubilized in water by 40% protonation with hydrochloric acid, and 0.8 parts by weight of ethylene glycol diglycidyl ether. The polyester substrate was filled with the formulation and left sandwiched between two polyethylene sheets at room temperature for 3–4 hours. The resulting membrane was dried at ambient temperature and humidity for about 40 min, and stored as in EXAMPLE 1. The substrate gained 10–12% of the original weight in this treatment.

The membrane produced according to this procedure had the nitrogen permeance of $4.5 \times 10^{-5}$ STPcm$^3$/cm$^2$·s·cmHg and the water vapor permeance of $1.0 \times 10^{-3}$ STPcm$^3$/cm$^2$·s·cmHg.

EXAMPLE 6

This example illustrates the use of water transfer material containing both polymeric components covalently cross linked using different cross linkers.

The water transfer formulation was prepared by mixing 50 parts by weight of 10 wt-% aqueous solution of poly (vinyl alcohol) with 50 parts by weight of 10 wt-% aqueous solution of poly(4-vinylpyridine) solubilized in water by 40% protonation with hydrochloric acid, and 0.7 parts of 50 wt-% aqueous solution of glutaraldehyde (cross linker for poly(vinyl alcohol)) and 0.8 parts of ethylene glycol diglycidyl ether (cross linker for poly(4-vinylpyridine)). The polyester substrate was filled with the formulation and left sandwiched between two polyethylene sheets at room temperature for 8–10 hours. The resulting membrane was dried at ambient temperature and humidity for about 40 min, and stored as in EXAMPLE 1. The substrate gained 10–12% of the original weight in this treatment.

The resulting membrane had the nitrogen permeance of $8.1 \times 10^{-5}$ STPcm$^3$/cm$^2$·s·cmHg and the water vapor permeance of $1.1 \times 10^{-3}$ STPcm$^3$/cm$^2$·s·cmHg.

EXAMPLE 7

This example illustrates the use of a monomer or monomer mixture and polymerization reaction to produce in situ one of t he polymeric components of the water transfer material.

The water transfer formulation was prepared by mixing 50 parts by weight of a 10 wt-% aqueous solution of poly(vinyl alcohol), 5 parts by weight of acrylic acid monomer, 1 part of N,N-methylenebisacrylamide (cross-linker for the acrylic acid), and 1.7 parts by weight of ammonium persulfate initiator, and 0.7 parts of 50 wt-% aqueous solution of glutaraldehyde (cross-linker for the poly(vinyl alcohol). A 0.5 N aqueous solution of sulfuric acid used as a cross linking catalyst for glutaraldehyde was subsequently stirred into the formulation in an amount of 0.25 gram per each gram of the formulation.

The formulation was applied to the polyester substrate sandwiched between two polyethylene sheets and the sandwich was placed in an oven at 80° C. for 20 min for the co-polymerization of acrylic acid with N,N,-methylenebisacrylamide and cross-linking of poly(vinyl alcohol) with glutaraldehyde to take place at the same time. The resulting membrane was dried in ambient temperature and humidity and stored in a polyethylene bag. The substrate gained 24% of the original weight in this treatment.

The resulting membrane had the nitrogen permeance of $1.9 \times 10^{-4}$ STPcm$^3$/cm$^2$·s·cmHg and the water vapour permeance of $8.0 \times 10^{-4}$ STPcm$^3$/cm$^2$·s·cmHg.

EXAMPLE 8

This example illustrates the use a hydrophobic porous support, commercially available from DSM Solutech.

A water transfer formulation containing 40 parts by weight of a 15 wt-% aqueous solution of poly(vinyl alcohol), 30 parts by weight of 30 wt-% aqueous solution of poly (sodium styrenesulfonate), and 0.55 to 0.82 parts by weight of a 50 wt-% solution of glutaraldehyde (cross linker) in water was prepared as in EXAMPLE 1. A 0.5 N aqueous solution of sulfuric acid used as a cross linking catalyst was subsequently stirred into the formulation in an amount of 0.25 gram per each gram of the formulation.

A sample of ultra high molecular weight polyethylene non-woven material having thickness of 60 μm and porosity of 83 vol-% was used. Because the material is hydrophobic, it was immersed into 2 wt-% aqueous solution of Triton X 114 surfactant for about 2 hours followed by drying at ambient conditions to render it water wettable. The formulation was applied to the substrate following the procedure described in EXAMPLE 1. The substrate gained 56% of the original weight in this treatment. The resulting membrane had the nitrogen permeance of $1.1 \times 10^{-6}$ STPcm$^3$/cm$^2$·s·cmHg and the water vapor permeance of $1.2 \times 10^{-3}$ STPcm$^3$/cm$^2$·s·cmHg.

EXAMPLE 9

This example illustrates the use of another porous polymeric substrate, namely, poly(vinylidene fluoride) commercially available from Millipore. The water transfer material in this example is composed of a neutral polymer (poly (vinyl alcohol) covalently cross-linked with glutaraldehyde) as a first component and a polyanion (poly(sodium styrenesulfonate)) as a second component.

A water transfer formulation containing 40 parts by weight of a 15 wt-% aqueous solution of poly(vinyl alcohol), 30 parts by weight of 30 wt-% aqueous solution of poly (sodium styrenesulfonate), and 0.55 to 0.82 parts by weight of a 50 wt-% solution of glutaraldehyde (cross linker) in water was prepared as in EXAMPLE 1. As a catalyst, a 5 wt-% aqueous solution of poly(styrenesulfonic acid) was used as described in EXAMPLE 2. The catalyst coated substrate gained 7.8% of the original weight.

A sample of the porous support having thickness of 120 μm, porosity of 60 vol-%, and ore size of 0.2 μm was used. The formulation was applied to the substrate following the procedure described in EXAMPLE 1. The substrate gained 20% of the original weight in this treatment. The resulting membrane had the nitrogen permeance of $2.2 \times 10^{-6}$ STPcm$^3$/cm$^2$·s·cmHg and the water vapour permeance of $1.1 \times 10^{-3}$ STPcm$^3$/cm$^2$·s·cmHg.

EXAMPLE 10

This example illustrates the use of porous polymeric substrate, namely, poly(vinylidene fluoride) commercially available from Millipore, to produce membranes as described in EXAMPLE 9 with ionic cross linking of the second component of the water transfer material.

A water transfer formulation containing 40 parts by weight of a 15 wt-% aqueous solution of poly(vinyl alcohol), 30 parts by weight of 30 wt-% aqueous solution of poly (sodium styrenesulfonate), modified by addition of calcium chloride in the amount equivalent to 0.5 mole of calcium per one mole of styrene sulfonate monomer in the poly(sodium styrenesulfonate), and 0.55 to 0.82 parts by weight of a 50 wt-% solution of glutaraldehyde (cross linker) in water was prepared as in EXAMPLE 3. The substrate of EXAMPLE 9 was coated with poly(styrene sulfonic acid) according to the procedure described in EXAMPLE 2. The catalyst coated substrate gained 7.7% of the original weight. The formulation was applied to the substrate following the procedure described in EXAMPLE 3. The substrate gained 17% of the original weight in this treatment. The resulting membrane had the nitrogen permeance of $2.2 \times 10^{-6}$ STPcm$^3$/cm$^2$·s·cmHg and the water permeance of $1.1 \times 10^{-3}$ STPcm$^3$/cm$^2$·s·cmHg. Membranes produced by this method had a gel with an apparent density being in the range of 0.32 g/cm3 at a relative humidity of 55%

EXAMPLE 11

This example illustrates the effect of pore size of the porous substrate on the nitrogen permeance of the membranes of this invention. The porous substrates used were Whatman filter papers having average pore sizes of 2.5 µm (no. 42), 8.0 µm (no. 40), and 20–25 µm (no. 41). The thickness of the substrates was in the range of 185–200 µm.

A water transfer formulation containing 40 parts by weight of a 15 wt-% aqueous solution of poly(vinyl alcohol), 30 parts by weight of 30 wt-% aqueous solution of poly (sodium styrenesulfonate), and 0.55 to 0.82 parts by weight of a 50 wt-% solution of glutaraldehyde (cross linker) in water was prepared and acidified with sulfuric acid as in EXAMPLE 1. The formulation was applied to each substrate following the general procedure described in EXAMPLE 1. After the cross-linking and gel formation step was completed (20–30 min), the membranes were dried at ambient temperature and humidity for about 40 min and stored subsequently in poly(ethylene) bags. The membranes were tested for nitrogen permeance. The results are presented in Table 4. They show an increase in the nitrogen permeance with the pore size of the substrate.

TABLE 4

| Pore Size (µm) | Membrane Content of Water Transfer Material (wt % add on) | Nitrogen Permeance (STPcm$^3$/cm$^2$·s·cmHg) |
|---|---|---|
| 2.5 | 25.2 | $5.0 \times 10^{-6}$ |
| 8 | 36.8 | $6.5 \times 10^{-6}$ |
| 20–25 | 45.8 | $2.0 \times 10^{-5}$ |

EXAMPLE 12

This example illustrate the stability of the water transfer material in selected membranes when under pressure. The stability was assessed by measuring the nitrogen permeance at different applied pressures. The membranes tested were prepared according to the procedure described in Example 1. The results are presented in Table 5.

TABLE 5

| Pressure (kPa) | Nitrogen Permeance (STPcm$^3$/cm$^2$·s·cmHg) |
|---|---|
| 100 | $2.7 \times 10^{-5}$ |
| 150 | $4.4 \times 10^{-5}$ |
| 200 | $5.9 \times 10^{-5}$ |
| 250 | $6.8 \times 10^{-5}$ |
| 300 | $8.0 \times 10^{-5}$ |
| 350 | $9.6 \times 10^{-5}$ |

The nitrogen permeance was found to increase with pressure but remained over four orders of magnitude lower than the permeance of untreated substrate which was found to be 0.35–0.5 STPcm$^3$/cm$^2$·s·cmHg. On return to lower pressures the nitrogen permeances were unchanged from those given in Table 5 indicating that no material had been blown out of the pores at the higher pressures.

EXAMPLE 13

This example illustrates the stability of the water transfer material in selected membranes. The selected membranes were immersed in water for 15, 60, and 120 min then dried, and the nitrogen permeance was measure. Any substantial loss of the water transfer material from the membrane pores would inevitably increase the nitrogen permeance.

The membranes tested were prepared according to examples 1, 9, and 10. The results of these experiments are presented in Table 6.

TABLE 6

| Membrane Prepared According to: | Time of Soaking in Water (min) | Nitrogen Permeance (STPcm$^3$/cm$^2$·s·cmHg) |
|---|---|---|
| EXAMPLE 1 | 0 | $5.1 \times 10^{-5}$ |
|  | 15 | $6.5 \times 10^{-5}$ |
|  | 60 | $7.2 \times 10^{-5}$ |
|  | 120 | $7.7 \times 10^{-5}$ |
| EXAMPLE 9 | 0 | $2.2 \times 10^{-5}$ |
|  | 15 | $3.1 \times 10^{-5}$ |
|  | 60 | $3.8 \times 10^{-5}$ |
|  | 120 | $4.2 \times 10^{-5}$ |
| EXAMPLE 10 (substrate no. 40) | 0 | $6.5 \times 10^{-6}$ |
|  | 15 | $1.0 \times 10^{-5}$ |
|  | 60 | $2.5 \times 10^{-5}$ |
|  | 120 | $3.1 \times 10^{-5}$ |

Even after two-hour soaking in water at ambient temperature, the increase in the nitrogen permeance of the membranes is insignifiant, thus establishing that the selected membranes are stable under high humidity conditions.

EXAMPLE 14

This example illustrates the effect of ionic cross-linking of the second component of water transfer material on stability to high humidity. Selected membranes were immersed in water for up to 72 hrs and then dried. The mass and the nitrogen permeance were measured.

The membranes tested were prepared according to EXAMPLE 9 and EXAMPLE 10. Membranes of known mass gain were immersed in water at room temperature for defined periods of time, removed from the water, dried (dried in vacuum at room temperature to a constant mass), the masses measured and their mass gains calculated. The nitrogen permeance of the membranes was then determined. The results of these experiments are presented in FIGS. 1 and 2.

Figure 1:
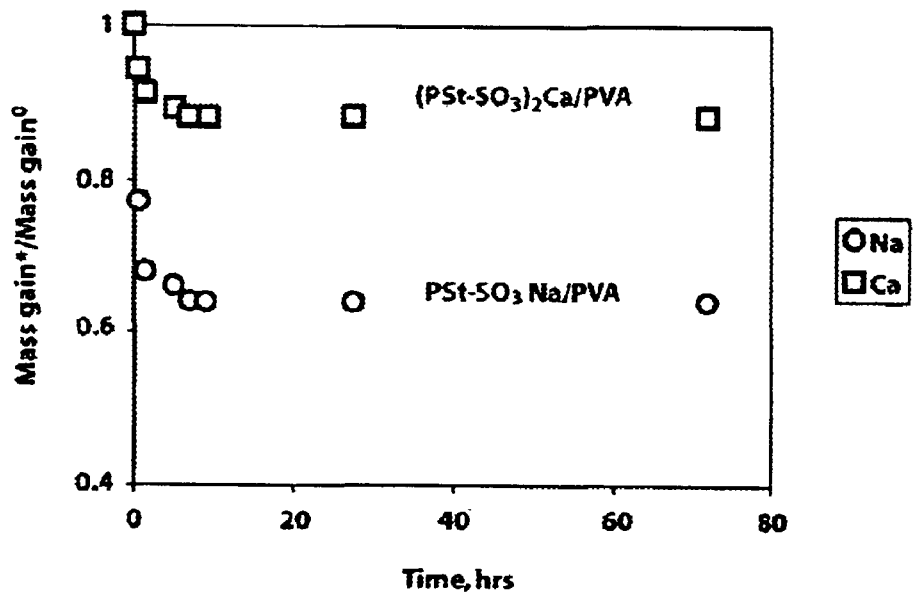
FIG. 1 is a plot of the change in mass gain as a function of time of immersion in liquid water for two separation membranes.
Figure 2:
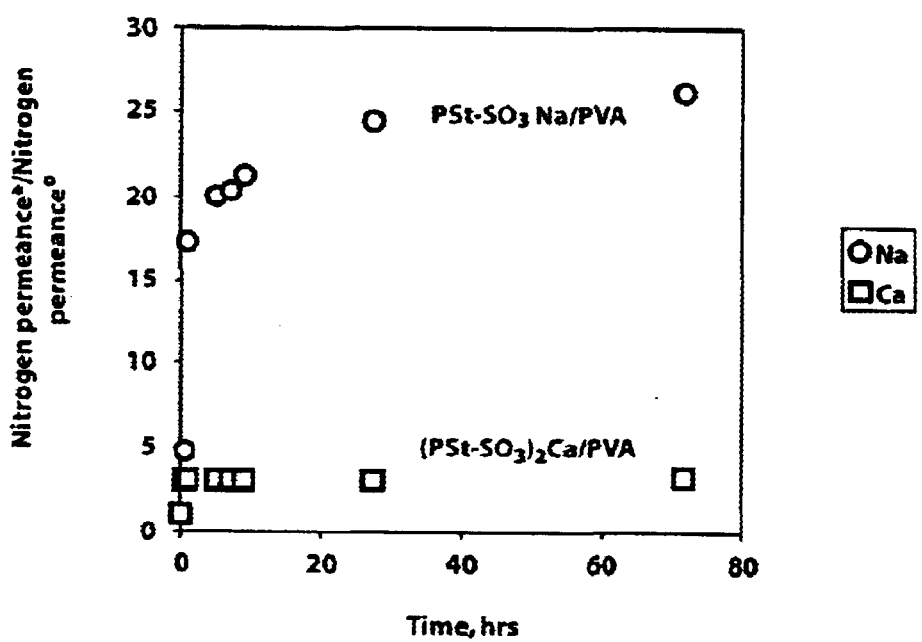
FIG. 2 is a plot of nitrogen permeance as function of the soaking time in water for the two membranes of FIG. 1.

FIG. 1 shows the changes in mass gain as a function of length of soaking in water. The changes in mass gain are expressed as the ratio of mass gain of membrane after soaking in water (mass gain*) to the mass gain of the membrane as initially formed. (mass gain$^o$). FIG. 2 shows changes in the nitrogen permeance (nitrogen permeance*/nitrogen permeance$^o$, where nitrogen permeance* is the nitrogen permeance of a dry membrane sample after exposure to water for certain time and nitrogen permeance$^o$ is the nitrogen permeance of initial dry membrane sample) for the membrane samples described above.

Two different formulations of the second component were used, namely a water transfer formulation containing poly (sodium styrenesulfonate) (EXAMPLE 9) and one with ionically cross linked poly(calcium styrenesulfonate) (EXAMPLE 10). As can be seen from FIG. 1, ionic cross linking has a significant effect on the stability of the water transfer material when exposed to bulk water. The membrane containing ionically cross linked second component of the water transfer material (EXAMPLE 10) showed an initial rapid loss of some 10–12% and thereafter had no change in mass gain on prolonged soaking in water. This initial loss of material could be due to loss of catalyst or removal of surface deposits. The membrane containing the ionically cross linked second component showed a very small increase in nitrogen permeance after the exposure to water for 72 hrs with a measured nitrogen permeance of $7.0 \times 10^{-6}$ STPcm$^3$/cm$^2$·s·cmHg.

In contrast, the membrane prepared without ionic cross-linking containing poly(sodium styrenesulfonate) (EXAMPLE 9) showed a loss in mass gain in the 35–40% range. This membrane also showed a major increase by a factor of 25 in nitrogen permeance to a value of $5.8 \times 10^{-5}$ STPcm$^3$/cm$^2$·s·cmHg after 72 hours soaking. While this is a large increase in nitrogen permeance it is still relatively low and the soaked membrane would be acceptable for use in many applications.

EXAMPLE 15

This example illustrates the distribution of the water transfer material through the thickness of the membrane.

A detailed study of the distribution of the water transfer material through the thickness of a supporting polyester membrane was carried out using an environmental scanning electron microscope (ESEM) analysis. Samples of the membranes were produced by the method described in EXAMPLE 9. Cross-sections of a dry membrane were obtained using a microtome and small samples (≈3×2 mm) were glued to aluminum stubs using a mixture of white glue and colloidal graphite CC010-2 (Marivac Limited). The samples on the stubs were viewed in an ElectroScan model 2020 ESEM (ElectroScan Corporation, Wilmington, Mass.). The distribution of sulfur across the cross-section was determined by Energy Dispersive X-ray (EDX) analysis using a PGT PRISM Si(Li) thin-window x-ray detector (Princeton Gamma Tech., Princeton, N.J.) mounted in the ESEM and connected to a PGT model IMIX-PTS microanalysis system. The cross-sections of modified membrane was x-ray analysed under following conditions: 20 kV, 5° tilt angle, 19.1 mm working distance, 45% condenser, 100 s acquisition time, 700× magnification, count rate 1500–2500 cps). The line profiles were generated by 100 s analyses of cross-sections for the modified membrane sample to obtain the distribution of sulfur across the membrane. It was found that the same level of sulfur was present throughout the entire cross-section indicating that the water-transfer material evenly filled the entire thickness of the membrane.

Each and every patent and nonpatent reference referred to herein is incorporated herein by reference. The disclosures of each of the following references are incorporated herein by reference:

1. Taylor J. A. Separation of water from hydrocarbons and halogenated hydrocarbons U.S. Pat. No. 4,857,081, 1989
2. Mulder M. H. V. Basic Principles of Membrane Technology; Kluwer Academic Publishers: Dordrecht, 1998.
3. Salemme, R. M. Sulfonated polyxylylene oxide as a permselective membrane for water vapor transport; U.S. Pat. No. 3,735,559, 1973.
4. Lovelock, J. E. Water-vapour permeable material; U.S. Pat. No. 5,160,511, 1992.
5. Hine, F.; Tilak, B. V.; Viswanathan, K. *Modern Aspects of Electrochemistry;* Plenum Press: New York, 1986.
6. Ganzel P. K.; Mertene U. *Ind. Eng. Chem. Process Des. Dev.* 1970, 9, 331.
7. Klass, D. L.; Landahl, C. D. Separation of nitrogen and methane containing gas mixtures; U.S. Pat. No. 3,616,607, 1971.
8. Stancell, A. F.; Spencer, A. T. Separating fluids with selective membranes; U.S. Pat. No. 3,657,113, 1972.
9. Kikukawa, H.; Shimoda, E.; Sakai, M.; Kitada, F. Process for selectively separating gaseous mixtures containing water vapor; U.S. Pat. No. 4,875,908, 1989.
10. Rice, A. W.; Murphy, M. K. Gas dehydration membrane apparatus; U.S. Pat. No. 4,783,201, 1988.
11. Browall, W. R. Method for sealing breaches in multi-layer ultrahin membrane composites; U.S. Pat. No. 3,980,456, 1976.
12. Henis, J. M. S.; Tripodi, M. K. Multicomponent membranes for gas separations; U.S. Pat. No. 4,230,463, 1980.
13. Benoit; R.; Machefer; J; Mauvisseau, J.; Plurien, P. Method of separation of a gas from a gas mixture; U.S. Pat. No. 4,239,507, 1980.
14. Y oshino, M.; Oguri, A. Static heat-and-moisture exchanger; U.S. Pat. No. 4,051,898, 1977.
15. Takashi et al., Japanese Pat. No. 60205163, 1985.
16. Martin, G. L.; Johnson, J. E.; Sparrow, E. E. M. Air-to-air heat and moisture exchanger incorporating a composite material for separating moisture from air technical field; U.S. Pat. No. 6,145,588, 2000.
17. A. M. Mika, R. F. Childs, J. M. Dickson, B. E. McCarry and D.R. Gagnon, "A New Class of Polyelectrolyte-Filled Microfiltration Membranes with Environmentally Controlled Porosity". *J. Membr. Sci.* 108, (1995) 37–56
18. D. M. Stachera, R. F. Childs, A. M. Mika and J. M. Dickson "Acid Recovery Using diffusion Dialysis with Poly(4-vinylpyridine) Filled Microporous Membranes". *J. Memb. Sci.* 148 (1998) 119–127.)
19. J. Niu and L. Z. Zhang, Membrane based enthalpy exhanger: material considerations and clarification of moisture resistance, J. Memb. Science, 189 (2001) 179–191.
20. Yonese M., Baka, K., Kishimoto H. Viscoelastic properties of poly(vinyl alcohol)alginate snake-cage hydrogels and interpenetrating hydrogels *Polymer Journal,* (Tokyo) 24, (1992) 395–404.
21. *Polymer Handbook;* John Wiley & Sons, Inc.: New York, 1999.

What is claimed is:

1. A separation device for the separation of water vapour from a gas stream, comprising a separation membrane having a porous support whose pores contain a water swellable gel, the gel including a first water absorbent polymer and a second polymer which is interwoven with the first polymer to improve the water absorbing and transfer capability of the gel.

2. A device as defined in claim 1 wherein the first polymer is a polymer network which is entangled with elements of the porous support and the second polymer is cross linked or non-cross linked.

3. A device as defined in claim 1, wherein the support has at least one outer surface and the gel is essentially entirely confined to within the pores of the membrane with essentially no gel on the outer surface.

4. A device as defined in claim 1 wherein the support has a pore volume which is essentially entirely filled by the gel.

5. A device as defined in claim 1 wherein a first cross-linking agent for the first polymer is included at a molar proportion relative to the first polymer of between about 0.5 and about 15 percent.

6. A device as defined in claim 5 wherein the relative molar proportion is between 0.5 and 10 percent.

7. A device as defined in claim 6 wherein the relative molar proportion is between 0.5 and 5 percent.

8. A device as defined in claim 1 wherein the weight content of the second polymer in the gel ranges from about 10 percent to about 90 percent.

9. A device as defined in claim 8 wherein the weight content of the second polymer in the gel ranges from about 25 percent to about 75 percent.

10. A device as defined in claim 9 wherein the weight content of the second polymer in the gel ranges from about 40 percent to about 60 percent.

11. A device as defined in claim 1 wherein the first polymer is grafted to elements of the support, and the second polymer is entangled with the grafted first polymer.

12. A device as defined in claim 1 wherein the first and second polymers are essentially independently cross-linked polymer networks.

13. A device as defined in claim 1 wherein the gel restricts passage of oxygen and nitrogen or mixtures thereof including air.

14. A device as defined in claim 1 wherein the gel restricts passage of hydrocarbon gases or mixtures including hydrocarbon gases.

15. A device as defined in claim 1 wherein at least one of the first and second polymers are hydrophilic.

16. A device as defined in claim 1 wherein one or both of the first and second polymers are ionically or covalently cross-linked.

17. A device as defined in claim 16 wherein the second polymer is a polyanion cross-linked with a second cross-linking agent containing multiple positive charges.

18. A device as defined in claim 17 where the second cross-linking agent is a multivalent metal selected from the group consisting of $Mg^{2+}$, $Ca^{2+}$, $Sr^{2+}$, $Ba^{2+}$, $Al^{3+}$, $Fe^{2+}$, $Fe^{3+}$, $Sn^{2+}$, $Mn^{2+}$, $Mn^{3+}$, $Ti^{4+}$, $Zr^{4+}$, $V^{2+}$, $V^{3+}$, $Cu^{2+}$, $Ni^{2+}$, $Co^{2+}$, $Zn^{2+}$ and $Cr^{3+}$.

19. A device as defined in claim 17 where the second cross-linking agent contains multiple positively charged sites including bis-, tris, or higher ammonium salts.

20. A device as described in claim 19 where the salts are selected from the group consisting of salts of ethylenediamine, 1,3-diaminopropane, piperazine, hexamethylenediamine and its homologues, 1,4-diazabicyclo[2,2,2]octane, diethylenetriamine, triethylenetetramine, and tetraethylenepentamine.

21. A device as defined in claim 16 wherein the second polymer is a polycation cross-linked with a second cross-linking agent containing multiple negative charges.

22. A device as described in claim 21 where the second cross-linking agent is a multivalent anion including $SO_4^{2-}$ and $PO_4^{3-}$.

23. A device as described in claim 22 wherein the second cross-linking agent contains multiple negatively charged sites including the salts of di-, tri- and higher polyacids.

24. A device as described in claim 23 wherein the salts are selected from the group consisting of succinic acid, glutaric acid, adipic acid, and higher homologues of these acids, fumaric acid, maleic acid, malic acid, oxalic acid, tartaric acid, citric acid, phthalic acid, trimesoic acid.

25. A device as defined in claim 1 wherein the first polymer includes a first covalent cross-linking agent.

26. A device as defined in claim 25 wherein the first cross-linking agent is selected from the group consisting of bisacrylamidoacetic acid, 1,3-butanediol diacrylate, 1,4-butanediol diacrylate 1,3-butanediol dimethacrylate, 1,4-butanediol dimethacrylate, 1,4-butanediol divinyl ether, N-(iso-butoxymethyl)methacrylamide, 1,4-cyclohexanediol dimethacrylate, 1,4-diacryloylpiperazine, diallyl diglycol carbonate, diallyl phthalate, diethylene glycol diacrylate, diethylene glycol dimethacrylate, diethylene glycol divinyl ether, 2,2-dimethylpropanediol dimethacrylate, dipropylene glycol dimethacrylate, divinyl glycol, divinyl sebacate, ethylene glycol diacrylate, ethylene glycol diglycidyl ether, ethylene glycol dimethacrylate, glutaraldehyde, glycerol trimethacrylate, 1,6-hexanediol diacrylate, N,N-methylenebisacrylamide, 1,3-phenylene diacrylate, 1,4-phenylene diacrylate, poly(ethylene glycol)-bisphenol A diglycidyl ether, poly(ethylene glycol)diacrylate, poly(ethylene glycol dimethacylate) poly(propylene glycol)diamethacrylate, propylene glycol diglycidyl ether, tetraethylene glycol dimethacrylate, triethylene glycol diacrylate, triethylene glycol dimethacrylate, triethylene glycol divinyl ether, triglycidyl isocyanurate, vinyl acrylate2,2-bis[4-(2-acryloethoxy)phenyl]propane, 2,2-bis[4-(2-hydoxy-3-methacryloproxy)phenyl]propane, bis(2-methacryloxyethyl)phosphate, 2,2-bis(4-methacryloxyphenyl)propane, bisphenol A, cinnamyl methacrylate, 1,10-decandiol dimethacrylate, N,N,-diallylacrylamide, diallyl fumarate, diallyl suberate, diallyltetrabromophthalate, N,N'-dimethacryloylpiperazine, divinylbenzene, glycerol tris(acryloxypropyl)ether, 1,5-hexadiene, N,N'-hexamethylenebisacrylamide, 1,6-hexandiol dimethacrylate, N,N'-octamethylenebisacrylamide, pentaerythritol triallyl ether, 1,5-pentadiol dimethacrylate, triallyl cyanurate, triallyl isocyanurate, triallyl phosphite, triallyl trimellitate, triglycidylglycerol, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, tris(2-acryloxyethyl)isocyanurate, 1,2,4-trivinylcyclohexane, 4-vinyl-1-cyclohexane dioxide, divinylpyridine, divinyl sulfone.

27. A device as defined in claim 1 wherein the first polymer, the second polymer, or both, include a polyelectrolyte.

28. A device as defined in claim 1 wherein the first polymer is a polycation, a polyanion, a polymer which can ionize in water to form polyanion or polycation, a neutral polymer or an amphoteric polymer.

29. A device as defined in claim 28 wherein the first polymer is selected from the group consisting of poly(2-hydroxypropyl-1-N-methylammonium) salts, poly(2-hydroxypropyl-1,1-N-methylammonium) salts, poly(N-vinylimidazolinum) salts, poly(diallyldimethylammonium) salts, protonated or quaternized poly(N,N-dimethyl-2-aminoethyl methacrylate),), poly(4-vinylpyridinium) salts, poly(vinylbenzyl ammonium) salts, poly(allylamine) hydrochloride, poly(ethyleneimine), poly(allylamine)poly [N-(dimethylaminoethyl)-acrylamide], poly(allylamine), poly(vinylbenzylamines), poly(N,N-dimethylaminopropyl)-methacrylamide, and natural polyamines including poly-L-lysine which are protonated in water to form polycations.

30. A device as defined in claim 28 wherein the first polymer is selected from the group consisting of acids or salts of poly(acrylic acid), poly(methacrylic acid), poly (styrene sulfonic acid), poly(vinylsulfonic acid) and their salts and natural polyacids, poly(alginic acid) and chitosan and their salts.

31. A device as defined in claim 28 wherein the first polymer is selected from the group consisting of poly(vinyl alcohol), poly(ethylene oxide), polyacrylamide, poly (vinylpyrrolidone), cellulose derivatives including cellulose acetate and natural polymers including agar-agar.

32. A device as defined in claim 1 wherein the second polymer is a polycation, a polyanion, a polymer which can ionize in water to form polyanion or polycation, a neutral polymer or an amphoteric polymer.

33. A device as defined in claim 32 wherein the second polymer is selected from the group consisting of poly(2-hydroxypropyl-1-N-methylammonium) salts, poly(2-hydroxypropyl-1,1-N-methylammonium) salts, poly(N-vinylimidazolinum) salts, poly(diallyldimethylammonium) salts, protonated or quaternized poly(N,N-dimethyl-2-aminoethyl methacrylate),), poly(4-vinylpyridinium) salts, poly(vinylbenzyl ammonium) salts, poly(allylamine) hydrochloride, poly(ethyleneimine), poly(allylamine) poly[N-(dimethylaminoethyl)-acrylamide], poly(allylamine), poly(vinylbenzylamines), poly(N,N-dimethylaminopropyl)-methacrylamide, and natural polyamines including poly-L-lysine which are protonated in water to form polycations.

34. A device as defined in claim 33 wherein the second polymer is selected from the group consisting of poly(N-methyl-4-vinylpyridinium salts cross-linked with ethylene glycol diglycidyl ether (EDGE), poly(acrylic acid) cross-linked with N,N-methylene-bis acrylamide, poly(ethyleneimine) cross-linked with EDGE, naphthalenedisulfonyl chloride, polypropylene glycol diglycidyl ether, or dialkylating agents or polymers from the group of poly(styrene sulfonic acid), poly(vinylsulfonic acid) or other poly(acids), cross-linked with $Mg^{2+}$, $Ca^{2+}$, $Sr^{2+}$, $Ba^{2+}$, $Al^{3+}$, $Fe^{2+}$, $Fe^{3+}$, $Sn^{2+}$, $Sn^{4+}$, $Mn^{2+}$, $Mn^{3+}$, $Ti^{4+}$, $Zr^{4+}$, $V^{2+}$, $V^{3+}$, $Cu^{2+}$, $Ni^{2+}$, $Co^{2+}$, $Zn^{2+}$ and $Cr^{3+}$ or other multivalent ions.

35. A device as defined in claim 32 wherein the second polymer is selected from the group consisting of acids or salts of poly(acrylic acid), poly(methacrylic acid), poly(styrene sulfonic acid), poly(vinylsulfonic acid) and their salts and natural polyacids, poly(alginic acid) and chitosan and their salts.

36. A device as defined in claims 32 wherein the second polymer is selected from the group consisting of poly(vinyl alcohol), poly(ethylene oxide), polyacrylamide, poly(vinylpyrrolidone), cellulose derivatives including cellulose acetate and natural polymers including agar-agar.

37. A device as defined in claim 1 wherein the gel has an average water content of 1 wt % to 30 wt %, at a relative humidity of 50 percent.

38. A device as defined in claim 37 wherein the gel has an average water content of 5 wt % to 30 wt %, at a relative humidity of 50 percent.

39. A device as defined in claim 37 wherein the gel has an average water content of 10 wt % to 30 wt %, at a relative humidity of 50 percent.

40. A device as defined in claim 1 wherein the support includes paper, porous polyolefin, or nonwoven or woven polyester fabrics, polysulfones, polycarbonates, nylons, cellulose, cellulose acetate or porous ceramics.

41. A device as defined in claim 40 wherein the membrane includes microporous poly(ethylene), poly(propylene), or poly(vinylidenedifluoride).

42. A device as defined in claim 40 wherein the support is flat, curved or tubular.

43. A device as defined in claim 40 wherein the support includes a hollow tube or a hollow fibre material.

44. A separation device for the separation of water vapour from a gas stream, comprising:
a porous support whose pores contain a water transfer gel;
said water transfer gel including a first polymer and a second polymer which is interwoven with the first polymer;
the first polymer being different from the second polymer, and each being selected from the group consisting of:
polycation is selected from the group consisting of poly(2-hydroxypropyl-1-N-methylammonium) salts, poly(2-hydroxypropyl-1,1-N-methylammonium) salts, poly(N-vinylimidazolinum) salts, poly(diallyldimethylammonium) salts, protonated or quaternized poly(N,N-dimethyl-2-aminoethyl methacrylate), poly(N,N-dimethylaminopropyl)-methacrylamide), poly(4-vinylpyridinium) salts, poly(vinylbenzyl ammonium) salts, poly(allylamine) hydrochloride, poly(ethyleneimine), poly(allylamine)poly[N-(dimethylaminoethyl)-acrylamide], poly(allylamine), poly(vinylbenzylamines), and natural polyamines including poly-L-lysine which are protonated in water to form polycations;
a polyanion selected from acids or salts of poly(acrylic acid), poly(methacrylic acid), poly(styrene sulfonic acid), poly(vinylsulfonic acid) and natural polyacids poly(alginic acid) and chitosan and their salts;
a neutral polymer selected from poly(vinyl alcohol), poly(ethylene oxide), polyacrylamide, poly(vinylpyrrolidone), cellulose derivatives including cellulose acetate and natural polymers including agar-agar;
a polymer which can ionize in water to form a polyanion or polycation; and
an amphoteric polymer; and
provided that the first and second polymers do not form a combination of a polyanion and a polycation.

45. A separation device for the separation of water vapour from a gas stream, comprising a porous support whose pores contain a water transfer material, the water transfer material including a first water absorbent constituent and a second constituent which is interwoven with the first constituent to improve water transfer.

46. A method of forming a separation device comprising the steps of:
preparing a water transfer material formulation by blending a first polymer with a second polymer in a solution to effect an entanglement between chains of the first polymer and chains of the second polymer;
providing a porous support having a plurality of pores;
filling at least some length of the pores with the formulation; and
subjecting the formulation in the pores to conditions causing the first polymer to cross-link to from a gel.

47. A method as defined in claim 46 wherein the preparing step includes the steps of:
adding, to the formulation, either a first catalytically activated cross-linker for the first polymer or a first cross-linking catalyst; and, prior to the filling step;
depositing, in the pores of the porous support, the other of the first catalytically activated cross-linker of the first polymer or the first cross-linking catalyst.

48. A method as defined in claim 47 in which the first cross-linking catalyst becomes part of the gel.

49. A method as defined in claim 46 wherein the preparing step includes:
adding, to the formulation, a first cross-linking agent for the first polymer.

50. A method as defined in claim 46 wherein the preparing step includes the step of depositing, in the pores of the porous supporting membrane, a first cross-linking agent to cross-link the first polymer.

51. A method as defined in claim 46 further comprising the step of cross-linking the second polymer.

52. A method as defined in claim 51 wherein the preparing step includes the steps of:
  adding, to the formulation, either a second catalytically activated cross-linker for the second polymer or a second cross-linking catalyst; and, prior to the filling step;
  depositing, in the pores of the porous supporting membrane, the other of the second catalytically activated cross-linker of the second polymer or the second cross-linking catalyst.

53. A method as defined in claim 51 wherein the preparing step includes:
  adding a second cross-linking agent to the formulation to cross link the second polymer.

54. A method as defined in claim 51 wherein the preparing step includes the step of depositing, in the pores of the porous supporting membrane, a second cross-linking agent to cross-link the second polymer.

* * * * *